(12) United States Patent
Hozumi et al.

(10) Patent No.: US 8,989,967 B2
(45) Date of Patent: Mar. 24, 2015

(54) VEHICLE SEAT DEVICE

(75) Inventors: Soichiro Hozumi, Nishio (JP); Toshiro Maeda, Anjo (JP); Hiroki Kino, Chita-gun (JP); Yuki Fujii, Anjo (JP); Takashi Okada, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 14/119,082

(22) PCT Filed: May 17, 2012

(86) PCT No.: PCT/JP2012/062688
§ 371 (c)(1),
(2), (4) Date: Nov. 20, 2013

(87) PCT Pub. No.: WO2012/161093
PCT Pub. Date: Nov. 29, 2012

(65) Prior Publication Data
US 2014/0097657 A1 Apr. 10, 2014

(30) Foreign Application Priority Data

May 25, 2011 (JP) .................................. 2011-116934
May 25, 2011 (JP) .................................. 2011-116935

(51) Int. Cl.
*G06F 7/00* (2006.01)
*B60N 2/08* (2006.01)
(Continued)

(52) U.S. Cl.
CPC ............ *B60N 2/0881* (2013.01); *B60N 2/0244* (2013.01); *B60N 2/08* (2013.01); *B60N 2/0228* (2013.01); *B60N 2/06* (2013.01); *B60N 2002/4455* (2013.01)
USPC ............................................... 701/49; 701/1

(58) Field of Classification Search
USPC .......................................................... 701/49
See application file for complete search history.

(56) References Cited

U.S. PATENT DOCUMENTS 5,187,665 A * 2/1993 Futami et al. .................... 701/49
6,986,493 B2 1/2006 Yokota
(Continued)

FOREIGN PATENT DOCUMENTS

JP 63-284043 11/1988
JP 7 5894 1/1995
(Continued)

OTHER PUBLICATIONS

International Preliminary Report on Patentability issued Nov. 26, 2013 in PCT/JP2012/062688 filed May 17, 2012.
(Continued)

*Primary Examiner* — Ian Jen
(74) *Attorney, Agent, or Firm* — Oblon, McClelland, Maier & Neustadt, L.L.P.

(57) ABSTRACT

A vehicle seat device includes a lock mechanism, a drive source, which has an output portion, a cancellation detection portion, which detects the cancellation of restriction by the lock mechanism, and a restriction detection portion, which detects restriction by the lock mechanism. When cancelling restriction on the basis of operation of the operation switch, current is supplied to the drive source such that the output portion moves in the forward direction until the cancellation detection portion has detected cancellation, and when the cancellation has been detected, the supply of current to the drive source is stopped. When performing the restriction on the basis of operation of the operation switch, current is supplied to the drive source such that the output portion moves in the reverse direction until the restriction detection portion has detected restriction, and when restriction has been detected, the supply of current to the drive source is stopped.

11 Claims, 13 Drawing Sheets

(51) Int. Cl.
  *B60N 2/02* (2006.01)
  *B60N 2/06* (2006.01)
  *G06F 17/00* (2006.01)
  *B60N 2/44* (2006.01)

(56) References Cited

U.S. PATENT DOCUMENTS

| | | | |
|---|---|---|---|
| 7,374,243 | B2 | 5/2008 | Kayumi et al. |
| 2005/0236881 | A1 | 10/2005 | Suda et al. |
| 2006/0231719 | A1 | 10/2006 | Kayumi et al. |
| 2010/0191426 | A1 | 7/2010 | Miyajima et al. |
| 2011/0087386 | A1* | 4/2011 | Steinhauser et al. ............ 701/2 |
| 2014/0277953 | A1* | 9/2014 | Hozumi et al. ............... 701/49 |

FOREIGN PATENT DOCUMENTS

| JP | 8 164779 | 6/1996 |
|---|---|---|
| JP | 2004 249962 | 9/2004 |
| JP | 2005 206154 | 8/2005 |
| JP | 3840554 | 8/2006 |
| JP | 2006-347470 | 12/2006 |
| JP | 2006 347514 | 12/2006 |
| JP | 4016107 | 9/2007 |
| JP | 2007-269134 | 10/2007 |
| JP | 2008 230532 | 10/2008 |
| JP | 2010-76553 | 4/2010 |

OTHER PUBLICATIONS

Written Opinion issued Jun. 19, 2012 in PCT/JP2012/062688 filed May 17, 2012 (English translation only).

U.S. Appl. No. 14/119,116, filed Nov. 20, 2013, Hozumi, et al.

International Search Report Issued Jun. 19, 2012 in PCT/JP12/062688 Filed May 17, 2012.

Search Report issued Nov. 7, 2014 in European Patent Application No. 12789779.1-1758.

* cited by examiner

VEHICLE SEAT DEVICE

TECHNICAL FIELD

The present invention relates to a vehicle seat device.

BACKGROUND ART

Conventionally, an example of a vehicle seat device as described in each of Patent Documents 1 and 2 is known. The vehicle seat device includes a lock mechanism, which restricts a sliding movement of a seat in the vehicle front back direction, and a drive source (actuator) for canceling the restriction of the lock mechanism on the basis of the operation of an operation switch. When current is supplied from a controller to the drive source on the basis of the operation of the operation switch, the drive source pulls a wire connected to the lock mechanism to cancel the restriction of the lock mechanism. In contrast, when the current is no longer supplied from the controller to the drive source, the restriction of the lock mechanism is performed by an urging force of a spring.

PRIOR ART DOCUMENTS

Patent Documents

Patent Document 1: Japanese Laid-Open Patent Publication No. 2005-206154
Patent Document 2: Japanese Patent No. 4016107

SUMMARY OF THE INVENTION

Problems that the Invention is to Solve

However, in the above-described vehicle seat device, when the current is no longer supplied to the drive source, the restriction of the lock mechanism is performed by the urging force of the spring. Accordingly, it is necessary to continue to flow the current into the drive source during a period in which the restriction of the lock mechanism is cancelled. Accordingly, there is a problem that power consumption becomes large. In particular, during a period in which the wire is pulled by the motor to an end thereof, lock current as large current continues to flow into the motor.

Therefore, it is an objective of the present invention to provide a vehicle seat device that can achieve low power consumption.

Means for Solving the Problems

In order to achieve the above described objective, a vehicle seat device including a lock mechanism, a drive source, a cancellation detection portion, and a restriction detection portion is provided. The lock mechanism restricts sliding movement of a seat. The drive source has an output portion that is selectively moveable in a forward direction and a reverse direction. The drive source is configured to, in a non-current supplied state, generate self-constriction force to restrict the output portion from being moved, and, in a current supplied state, selectively drive the output portion in two directions, that is, the forward direction, in which restriction is cancelled, and the reverse direction, in which the restriction is performed, in accordance with a direction in which current is supplied such that sliding movement of the seat is restricted by the lock mechanism and the restriction is cancelled based on operation of an operation switch. The cancellation detection portion detects that the restriction by the lock mechanism is cancelled. The restriction detection portion detects that the restriction by the lock mechanism is performed. The vehicle seat device is configured as described below. When cancelling the restriction based on the operation of the operation switch, the current is supplied to the drive source to move the output portion in the forward direction until the cancellation is detected by the cancellation detection portion, and when the cancellation is detected, the supply of current to the drive source is stopped. When performing the restriction based on the operation of the operation switch, the current is supplied to the drive source to move the output portion in the reverse direction until the restriction is detected by the restriction detection portion, and when the restriction is detected, the supply of current to the drive source is stopped.

According to the above configuration, when cancelling the restriction by the lock mechanism on the basis of the operation of the operation switch, the current is supplied to the drive source to drive the output portion in the forward direction (direction in which the restriction is cancelled) until the cancellation detection portion detects the cancellation, and the supply of current is stopped when the cancellation is detected. Since the drive source has a self-constriction force by which the output portion thereof cannot be moved in the non-current supplied state, the flow of the current is intercepted. The state where the restriction by the lock mechanism is cancelled is maintained even if the operation of the operation switch to cancel the restriction is continued to be performed. When performing the restriction on the basis of the operation of the operation switch, the current is supplied to the drive source such that the output portion is moved in the reverse direction (direction in which the restriction is performed) until the restriction is detected by the restriction detection portion, and the supply of current to the drive source is stopped when the restriction is detected. Accordingly, the flow of the current is intercepted after the restriction by the lock mechanism is performed. Therefore, the current is restricted from continuing to flow into the drive source so that the low power consumption is achieved.

Effects of the Invention

According to the vehicle seat device of the present invention, the low power consumption is achieved.

MODES FOR CARRYING OUT THE INVENTION

First Embodiment

Figure 1:
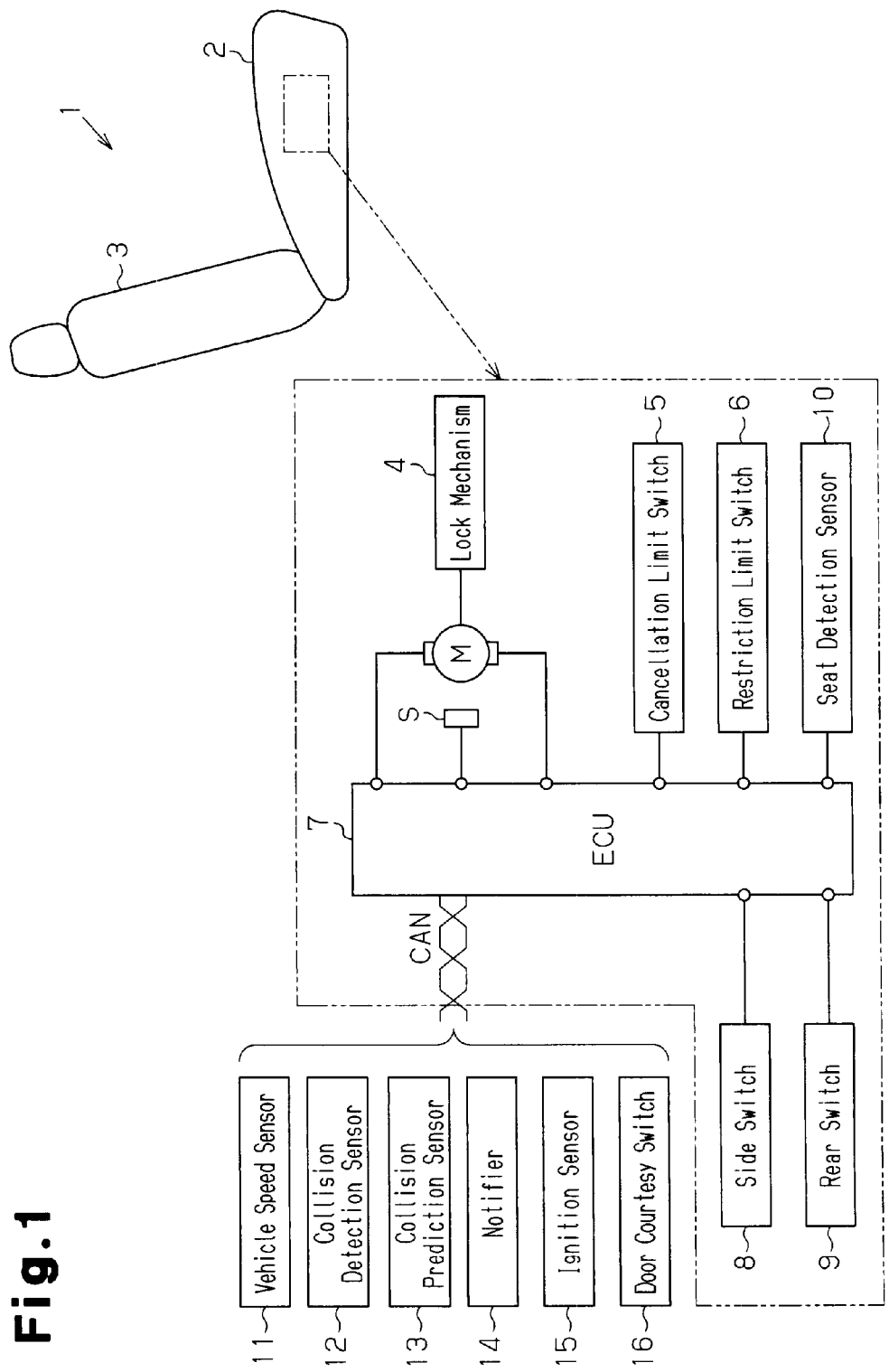
FIG. 1 is a block diagram for illustrating a vehicle seat device according to a first embodiment of the present invention.

Hereinafter, a vehicle seat device according to a first embodiment of the present invention will be described with reference to FIGS. 1 to 5. As shown in FIG. 1, a seat 1 includes a seat cushion 2 forming a seat portion, and a seat back 3 pivotally supported by a rear end portion of the seat cushion 2.

A lock mechanism 4, which restricts the sliding movement of the seat 1, is provided in the seat 1. A motor M as a drive source, which drives the lock mechanism 4 to restrict the sliding movement of the seat 1 and cancel the restriction, is provided in the seat 1. The seat 1 of the present embodiment is provided in a slidable manner along a lower rail (not shown), which is fixed to a vehicle floor and extends in the vehicle front back direction. The lock mechanism 4 restricts the sliding movement of the seat 1. The lock mechanism 4 is publicly known, and, specifically, restricts the sliding movement of the seat 1 by inserting a lock pawl formed on the seat 1 into any of a plurality of lock holes formed in the lower rail. The motor M has an output portion, which can move, namely rotate selectively in the forward and the reverse directions. As for the motor M, the output portion thereof is connected to the lock mechanism 4. The motor M has a self-constriction force by which the output portion is prevented from moving in the non-current supplied state. In contrast, in the current supplied state, the motor M drives the output portion selectively in two directions, namely a forward direction as a direction in which the restriction by the lock mechanism 4 is cancelled, and a reverse direction as a direction in which the restriction is performed in accordance with the direction in which the current is supplied. A rotation sensor S, which detects the number of rotations of the rotation axis of the motor M, is provided for the motor M. The rotation axis is connected to the output portion.

A cancellation limit switch 5, which serves as a cancellation detection portion that detects that the restriction by the lock mechanism 4 is cancelled by contacting/separating from a part of the lock pawl or the output portion, and a restriction limit switch 6, which serves as a restriction detection portion that detects that the restriction by the lock mechanism 4 is performed, are provided in the seat 1, for example.

An electronic control unit (ECU) 7 as a control portion for controlling the motor M, and a side switch 8 and a rear switch 9 as operation switches for operating the restriction by the lock mechanism 4 and the cancellation thereof are provided in the seat 1. The side switch 8 is arranged on a lateral surface of the seat cushion 2, and the rear switch 9 is arranged on a rear surface of the seat back 3. The side switch 8 or the rear switch 9 corresponds to an automatic restoration push button type operation switch, which is set to maintain the cancelled state when it is biased (pushed), and be automatically restored to cause the restricted state when it is not biased (not pushed). A seat detection sensor 10, which detects whether or not an occupant has been seated on the seat 1, is provided in the seat 1.

Next, an electric configuration of the vehicle seat device of the present embodiment will be described.

As shown in FIG. 1, the motor M (including the rotation sensor S), the cancellation limit switch 5, the restriction limit switch 6, the side switch 8 or the rear switch 9, and the seat detection sensor 10 are electrically connected to the ECU 7. A vehicle speed sensor 11, a collision detection sensor 12, a collision prediction sensor 13, and a notifier 14 are connected through in-vehicle network, namely controller area network CAN or a module, which is not shown, to the ECU 7. The collision detection sensor 12 corresponds to an acceleration sensor, which detects that the vehicle collides or is collided, for example. The collision prediction sensor 13, for example, corresponds to a rear radar, which detects a distance between the vehicle and a following vehicle and that the vehicle is likely to be or most likely to be collided by the following vehicle. The notifier 14 corresponds to an indicator including a car navigation display or an alert lamp, which makes a visual notification, or a speaker, which makes an audible notification. Parts such as an ignition sensor 15 and a door courtesy switch 16 are also connected through the in-vehicle network, namely CAN or the module, which is not shown, to the ECU 7.

The ECU 7 controls the current supply to the motor M on the basis of the operation of the operation switch (the side switch 8 or the rear switch 9).

Figure 2:
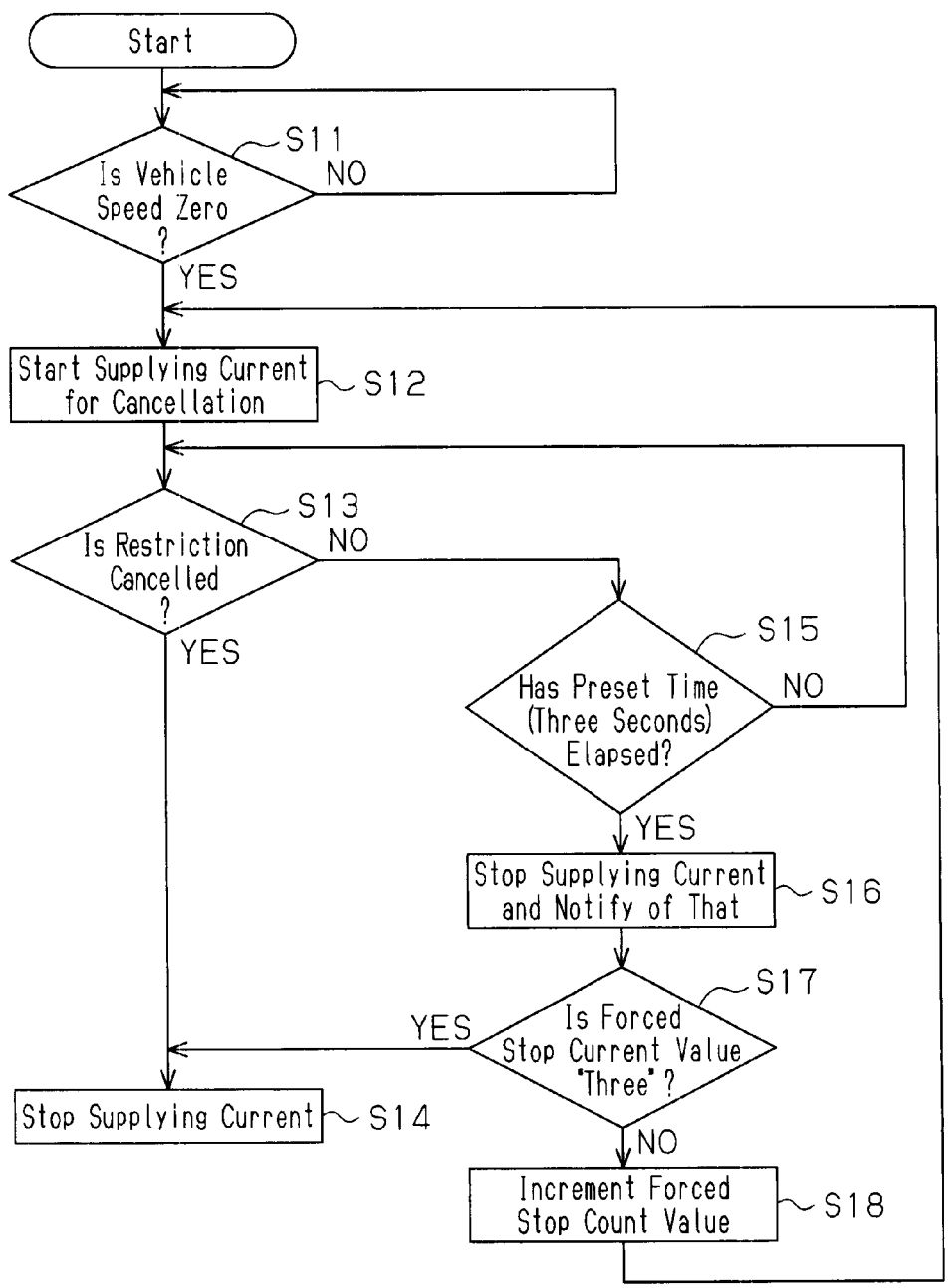
FIG. 2 is a flowchart for illustrating a process executed by an electronic control unit (ECU) according to the first embodiment.

For example, when the side switch 8 is being pushed to cancel the restriction by the lock mechanism 4, the ECU 7 starts a process shown in FIG. 2, and controls the motor M to maintain the state where the restriction by the lock mechanism 4 is performed until preset cancellation conditions except for the operation of the operation switch (the side switch 8 or the rear switch 9) are satisfied (cancellation limitation control).

More specifically, the cancellation conditions of the present embodiment correspond to vehicle speed cancellation conditions, which are satisfied by a fact that the vehicle speed is zero when the operation switch (the side switch 8 or the rear switch 9) is operated. That is, in step S11, the ECU 7 determines whether or not the vehicle speed detected by the vehicle speed sensor 11 is zero. If the ECU 7 determines that the vehicle speed is zero, the process proceeds to step S12. If the vehicle speed detected by the vehicle speed sensor 11 is not zero, namely the vehicle is running, step S11 is repeated.

In step S12, the ECU 7 starts supplying the current to the motor M to drive the output portion in the forward direction as a direction in which the restriction by the lock mechanism 4 is cancelled, and the process proceeds to step S13.

In step S13, the ECU 7 determines whether or not the cancellation limit switch 5 has detected that the restriction by the lock mechanism 4 has been cancelled. If the cancellation limit switch 5 detects that the cancellation has been performed, the process proceeds to step S14 to stop supplying the current to the motor M. If the cancellation limit switch 5 does not detect that the cancellation is performed, the process of the ECU 7 proceeds to step S15.

In step S15, the ECU 7 determines whether or not a preset time (for example, three seconds) has elapsed since the supply of current began. If the preset time (for example, three seconds) has not elapsed, the process returns to above step S13. That is, when cancelling the restriction on the basis of the operation of the operation switch (the side switch 8 or the rear switch 9), the ECU 7 supplies the current to the motor M such that the output portion moves in the forward direction until the cancellation limit switch 5 detects the cancellation and stops supplying the current to the motor M if the cancellation is detected before the preset time (for example, three seconds) elapses. The preset time (for example, three seconds) in step S15 corresponds to a time in which the cancellation of the restriction is detected by the cancellation limit switch 5 before the time elapses when normally operated. For example, the preset time corresponds to a time that elapses when certain failure is caused in a power transmission pathway.

In step S15, if the preset time (for example, three seconds) has elapsed, the process of the ECU 7 proceeds to step S16.

In step S16, the ECU 7 stops supplying the current to the motor M, and operates the notifier 14 to be in the notifying mode to allow the notifier 14 to notify of the state (for example, the fact that the cancellation is not normally performed), and the process proceeds to step S17. That is, in the case where preset forced stop conditions except for the detection by the cancellation limit switch 5 or the restriction limit switch 6 are satisfied when the ECU 7 supplies the current to the motor M, the ECU 7 stops supplying the current to the motor M. The forced stop conditions of the present embodiment correspond to time lapse forced stop condition, which is satisfied if a preset time (for example, three seconds) has elapsed.

In step S17, the ECU 7 determines whether or not a forced stop count value is "three". If the forced stop count value is not "three", the process proceeds to step S18. In step S18, the ECU 7 increments the forced stop count value (an initial value is "zero") by one (+1), and the process returns to above step S12. In step S17, if the forced stop count value is "three", the process proceeds to above step S14 and the state where the supply of current to the motor M is stopped is maintained. That is, if the preset time (for example, three seconds) has elapsed without detection of the cancellation by the cancellation limit switch 5, the ECU 7 stops supplying the current to the motor M. Thereafter, a retry control for supplying the current to the motor M again is repeated a preset number of times (in this example, three times).

Figure 3:
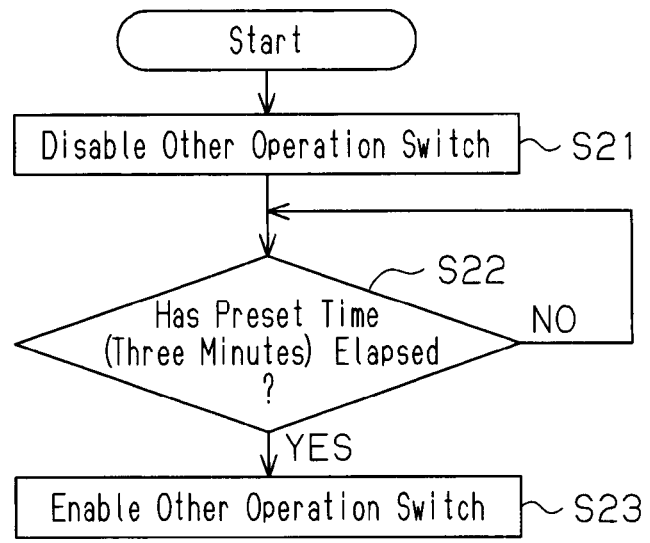
FIG. 3 is a flowchart for illustrating a process executed by the ECU of the first embodiment.

For example, if the side switch 8 is pushed to cancel the restriction by the lock mechanism 4, the ECU 7 starts a process (restriction cancellation control) shown in FIG. 3 in parallel with the process shown in FIG. 2. In step S21, the ECU 7 disables the operation of the other operation switch (operation switch except for the operated side switch 8), namely the rear switch 9, and the process proceeds to step S22.

In step S22, the ECU 7 determines whether a preset time (for example, three minutes) has elapsed. If the preset time (for example, three minutes) has elapsed, the process proceeds to step S23 to enable the operation of the other operation switch, namely the rear switch 9. If the preset time (for example, three minutes) has not elapsed, step S22 is repeated. In the present embodiment, time termination conditions, which are satisfied if the preset time (for example, three minutes) has elapsed, correspond to priority termination conditions (corresponding to conditions for terminating giving priority to the first operated operation switch). That is, the ECU 7 starts controlling the motor M on the basis of the operation of the first operated one (side switch 8) of the side switch 8 and the rear switch 9, and thereafter disables the operation of the other operation switch (rear switch 9) until the time termination conditions (priority termination conditions) are satisfied.

Figure 4:
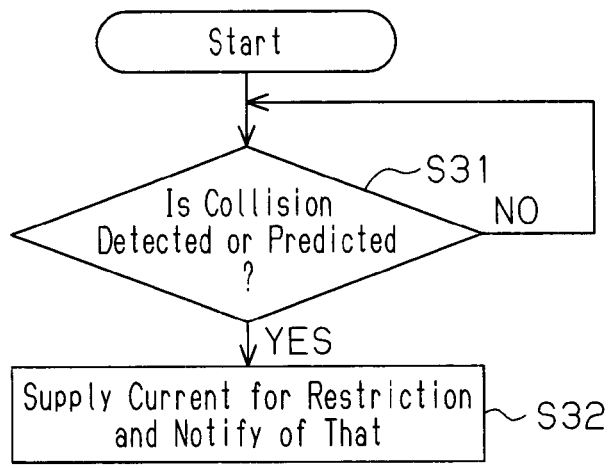
FIG. 4 is a flowchart for illustrating a process executed by the ECU of the first embodiment.

When it is detected that the restriction has been cancelled in above step S13 (refer to FIG. 2), the ECU 7 starts a process shown in FIG. 4 in parallel with the process in step S14.

As shown in FIG. 4, in step S31, the ECU 7 determines whether or not the collision detection sensor 12 and the collision prediction sensor 13 detect a vehicle collision or determine that the vehicle collision is likely to be caused. If the ECU 7 determines that the vehicle collision is detected or the vehicle collision is likely to be caused, the process of the ECU 7 proceeds to step S32. If the vehicle collision is not detected and it is determined that the vehicle collision is not likely to be caused, step S31 is repeated.

In step S32, the ECU 7 supplies the current to the motor M such that the output portion moves in the reverse direction as a direction in which the restriction by the lock mechanism 4 is performed so that the restriction by the lock mechanism 4 is performed, and operates the notifier 14 to be in the notifying mode to allow the notifier 14 to notify of the state (for example, the restriction by the lock mechanism 4 is performed due to an emergency state). That is, in the case where the restriction by the lock mechanism 4 is cancelled on the basis of the operation of the operation switch (the side switch 8 or the rear switch 9), if forced restriction conditions except for the operation of the operation switch are satisfied, the ECU 7 controls the motor M such that the restriction by the lock mechanism 4 is performed regardless of the operation of the operation switch (forced restriction control). In the present embodiment, the forced restriction conditions correspond to emergency conditions, which are satisfied if the vehicle collision is detected or if it is determined that the vehicle collision is likely to be caused.

Figure 5:
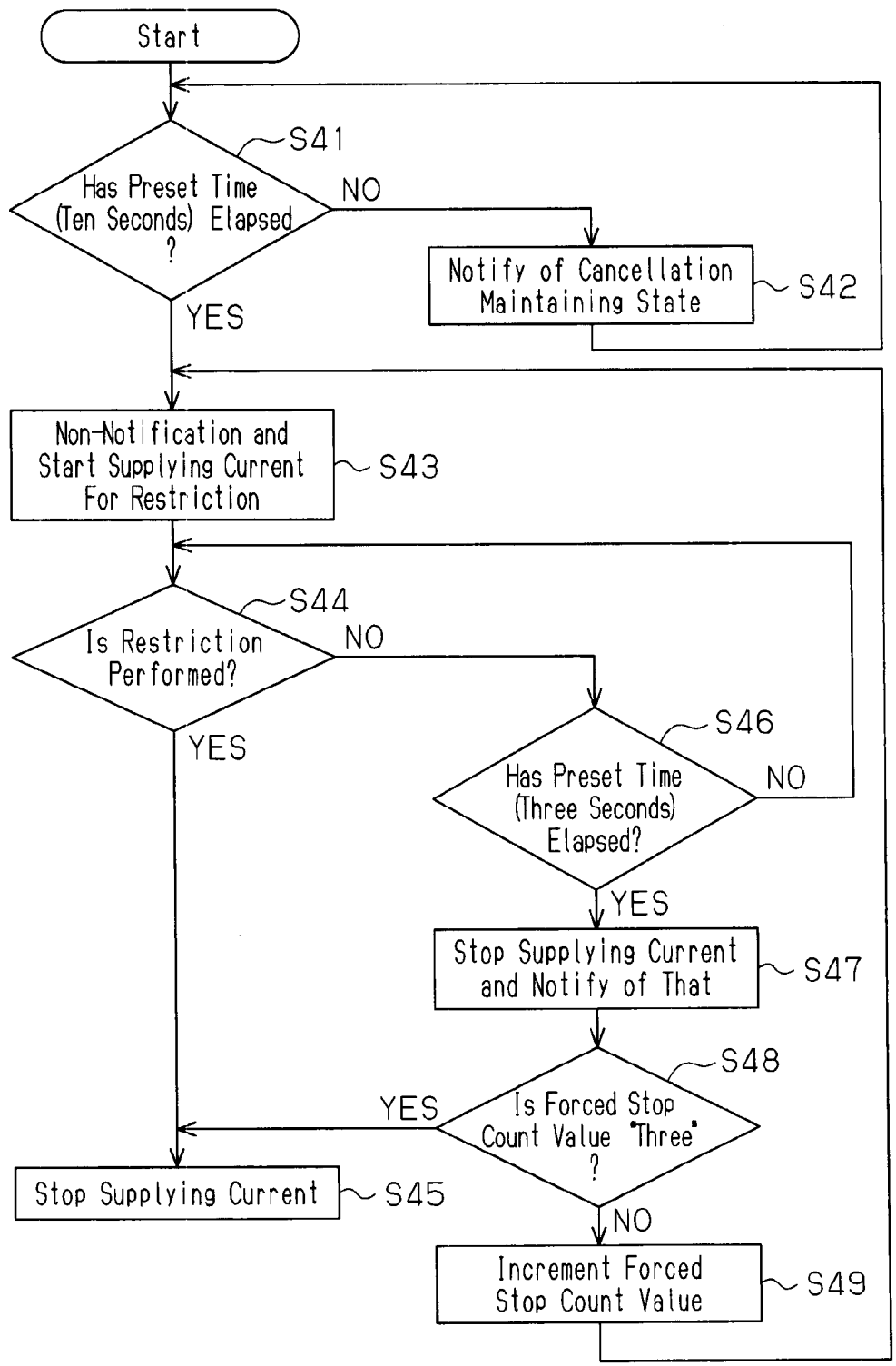
FIG. 5 is a flowchart for illustrating a process executed by the ECU of the first embodiment.

Next, if the hand is taken off the side switch 8 so that the side switch 8 is automatically restored from the state where the process has proceeded to above step 14 to its original position to perform the restriction by the lock mechanism 4, the ECU 7 starts a process shown in FIG. 5, and controls the motor M to maintain the state where the restriction by the lock mechanism 4 is cancelled until preset restriction conditions except for the operation of the operation switch are satisfied (restriction limitation control).

In detail, the restriction conditions of the present embodiment correspond to the time lapse restriction condition, which is satisfied if a preset time (for example, ten seconds) has elapsed since the operation switch (the side switch 8 or the rear switch 9) has been operated. That is, in step S41, it is determined whether or not the preset time (for example, ten seconds) has elapsed since the operation switch (the side switch 8 or the rear switch 9) has been operated (namely, automatically restored to its original position). If the ECU 7 determines that the preset time (for example, ten seconds) has not elapsed, the process proceeds to step S42. In step S42, the ECU 7 operates the notifier 14 to be in the notifying mode to allow the notifier 14 to notify of the state (for example, the fact that the canceled state is still maintained), and the process returns to step S41.

In step S41, if the preset time (for example, ten seconds) has elapsed, the process of the ECU 7 proceeds to step S43.

In step S43, the ECU 7 operates the notifier 14 to be in the non-notifying mode (for example, allows the notifier 14 to stop notifying of the state where the cancelled state is still maintained), and starts supplying the current to the motor M to drive the output portion in the reverse direction as a direction in which the restriction by the lock mechanism 4 is performed, and the process proceeds to step S44.

In step S44, the ECU 7 determines whether or not the restriction limit switch 6 has detected that the restriction by the lock mechanism 4 has been performed. If the restriction limit switch 6 detects that the restriction has been performed, the process proceeds to step S45 to stop supplying the current to the motor M. If it is not detected that the restriction has been performed, the process of the ECU 7 proceeds to step S46.

In step S46, the ECU 7 determines whether or not a preset time (for example, three seconds) has elapsed since the current has been started to be supplied. If the preset time (for example, three seconds) has not elapsed, the process returns to above step S44. That is, when performing the restriction is performed on the basis of the operation of the operation switch (the side switch 8 or the rear switch 9), the ECU 7 supplies the current to the motor M such that the output portion moves in the reverse direction until the restriction limit switch 6 detects the restriction, and stops supplying the current to the motor M if the restriction is detected before the preset time (for example, three seconds) elapses. The preset time (for example, three seconds) in step S46 corresponds to a time in which the restriction is detected by the restriction limit switch 6 before the time elapses when normally operated. For example, the preset time corresponds to a time that elapses when certain failure is caused in the power transmission pathway.

In step S46, if the preset time (for example, three seconds) has elapsed, the process of the ECU 7 proceeds to step S47.

In step S47, the ECU 7 stops supplying the current to the motor M, and operates the notifier 14 to be in the notifying mode to allow the notifier 14 to notify of the state (for example, the fact that the restriction is not normally performed), and the process proceeds to step S48.

In step S48, the ECU 7 determines whether or not a forced stop count value is "three". If the forced stop count value is not "three", the process proceeds to step S49. In step S49, the ECU 7 increments the forced stop count value (an initial value is "zero") by one (+1), and the process returns to above step S43. In step S48, if the forced stop count value is "three", the process proceeds to above step S45 and the state where the supply of current to the motor M is stopped is maintained. That is, if the preset time (for example, three seconds) has elapsed without detecting by the restriction limit switch 6 the restriction, the ECU 7 stops supplying the current to the motor M, and thereafter the retry control for supplying the current to the motor M again is repeated a preset number of times (in this example, three times).

Next, the operation of the vehicle seat device as above configured will be described.

For example, even if the side switch 8 is being pushed to cancel the restriction by the lock mechanism 4, the restriction by the lock mechanism 4 will not be cancelled while the vehicle is running. If the vehicle speed is zero, namely the vehicle is stopped, the current is started to be supplied to the motor M in the direction in which the restriction is cancelled. In this case, the operation of the other operation switch (except for the operated side switch 8), namely the rear switch 9 is disabled for a preset time (for example, three minutes).

If the cancellation limit switch 5 detects that the restriction by the lock mechanism 4 has been cancelled, the supply of current to the motor M is stopped. If it is determined that the collision detection sensor 12 and the collision prediction sensor 13 detect the vehicle collision or that the vehicle collision is likely to be caused after it is detected that the restriction has been cancelled, the current is supplied to the motor M in the direction in which the restriction is performed so that the restriction by the lock mechanism 4 is performed and the notifier 14 notifies of the state. If the preset time (for example, three seconds) has elapsed without detecting that the restriction is cancelled by the cancellation limit switch 5 from when the supply of current began, the supply of current to the motor M is stopped. Thereafter, the retry control for again supplying the current to the motor M is repeated a preset number of times (in this example, three times).

If the hand is taken off the side switch 8 in the state where the restriction by the lock mechanism 4 is cancelled and the supply of current to the motor M is stopped, the state where the restriction is cancelled is maintained until the preset time (for example, ten seconds) elapses after the side switch 8 is automatically restored to its original position, and the notifier 14 notifies of the state. If the preset time (for example, ten seconds) has elapsed, the supply of current to the motor is started in the direction in which the restriction is performed.

If the restriction limit switch 6 detects that the restriction by the lock mechanism 4 has been performed, the supply of current to the motor M is stopped. If the preset time (for example, three seconds) elapsed without detecting by the restriction limit switch 6 that the restriction was performed after the supply of current was started, the supply of current to the motor M is stopped. Thereafter, the retry control for supplying the current to the motor M again is repeated a preset number of times (in this example, three times).

The above embodiment has the following advantages.

(1) When cancelling the restriction by the lock mechanism 4 on the basis of the operation of the operation switch (the side switch 8 or the rear switch 9), the current is supplied to the motor M by the ECU 7 such that the output portion moves in the forward direction (direction in which the restriction is cancelled) until the cancellation limit switch 5 detects the cancellation, and when the cancellation is detected, the supply of current to the motor M is stopped by the ECU 7. Since the motor M has a self-constriction force, the output portion thereof cannot be moved in the non-current supplied state. Even if the operation of the operation switch to cancel the restriction is continued to be performed, the flow of the current is intercepted and the state where the restriction by the lock mechanism is cancelled is maintained. When performing the restriction on the basis of the operation of the operation switch, the current is supplied to the motor M by the ECU 7 such that the output portion is driven in the reverse direction (direction in which the restriction is performed) until the restriction is detected by the restriction limit switch 6, and when the restriction is detected, the supply of current to the motor M is stopped by the ECU 7. Accordingly, the flow of the current is intercepted after the restriction by the lock mechanism 4 is performed. Therefore, the current is restricted from continuing to flow into the motor M so that low power consumption is achieved.

In the conventional vehicle seat device disclosed in the background art, it is necessary to continue to flow the current into the drive source, namely the motor in the period in which the restriction by the lock mechanism is cancelled. Accordingly, in the state where the wire is pulled by the motor to an end thereof, lock current as large current continues to flow into the motor. This reduces the durability of the motor. In contrast, in the present embodiment, the current is restricted from continuing to flow into the motor M so that the durability of the motor M is improved in comparison to the conventional device in which the current continues to flow into the motor.

(2) If the preset forced stop conditions except for the detection by the cancellation limit switch 5 or the restriction limit switch 6 are satisfied in the case where the current is supplied to the motor M, the current supply to the motor M is stopped by the ECU 7. Specifically, in the present embodiment, the forced stop conditions correspond to the time lapse forced stop conditions, which are satisfied if the preset time (for example, three seconds) has elapsed. Accordingly, for example, even if certain failure is caused in the cancellation limit switch 5 or the restriction limit switch 6, the current is restricted from continuing to flow into the motor M when the preset time (for example, three seconds) has elapsed.

(3) If the forced stop conditions (time lapse forced stop conditions) are satisfied, the supply of current to the motor M is stopped by the ECU 7, and the retry control for supplying the current to the motor M again is performed the preset number of times (in the present embodiment, three times). Accordingly, when a slight mechanical catch is caused, it may be cancelled by the retry control. Therefore, the normal drive is more likely to be recovered, for example.

(4) If the forced stop conditions (time lapse forced stop conditions) are satisfied, the ECU 7 operates the notifier 14 to be in the notifying mode so that the notifier 14 notifies of the state. This facilitates the occupant to recognize that the forced stop conditions (time lapse forced stop conditions) are satisfied.

(5) When performing the restriction by the lock mechanism 4 on the basis of the operation of the operation switch (the side switch 8 or the rear switch 9), the motor M is controlled by the ECU 7 such that the state where the restriction by the lock mechanism 4 is cancelled is maintained until the preset restriction conditions except for the operation of the operation switch are satisfied. Specifically, in the present embodiment, the restriction conditions correspond to the time lapse restriction condition, which is satisfied if the preset time (for example, ten seconds) elapsed after the operation switch was operated. Accordingly, the state where the restriction by the lock mechanism 4 is cancelled is maintained until the preset time (for example, ten seconds) elapses. Therefore, for example, the seat 1 is freely moved until the preset time elapses even in the state where the operation switch is not operated so that convenience is improved.

(6) The operation switch (the side switch 8 or the rear switch 9) corresponds to an automatic restoration push button type operation switch set to maintain the cancelled state in the state where it is biased (pushed), and be automatically restored to cause the restricted state in the case where it is not biased (pushed) (the hand is taken off). Therefore, the seat 1 is freely moved until the restriction conditions are satisfied even after the hand is taken off the operation switch so that the convenience is improved.

(7) The operation switch (the side switch 8 or the rear switch 9) includes the rear switch 9 arranged on the rear surface of the seat back 3. Accordingly, the seat 1 is freely moved until the restriction conditions are satisfied even after an occupant seated on a seat behind the seat back 3 biases (pushes) the rear switch and then leaves the hand off the rear switch, for example. This facilitates the passenger to exit the vehicle through a front vehicle door.

(8) When performing the restriction by the lock mechanism 4 on the basis of the operation of the operation switch, the ECU 7 operates the notifier 14 to be in the notifying mode so that the notifier 14 notifies of the state (for example, the state where the cancelled state is still maintained) until the restriction conditions are satisfied. This facilitates the occupant to recognize that the state where the restriction by the lock mechanism 4 is cancelled is maintained.

(9) When cancelling the restriction by the lock mechanism 4 on the basis of the operation of the operation switch (the side switch 8 or the rear switch 9), the motor M is controlled by the ECU 7 such that the state where the restriction by the lock mechanism 4 is performed is maintained until the preset cancellation conditions except for the operation of the operation switch are satisfied. Specifically, in the present embodiment, the cancellation conditions correspond to the vehicle speed cancellation conditions, which are satisfied if the vehicle speed is zero when the operation switch is operated. Accordingly, the state where the restriction by the lock mechanism 4 is performed is maintained until the vehicle speed becomes zero, namely while the vehicle is running. Therefore, for example, the abrupt sliding of the seat 1 due to the behavior of the vehicle is limited.

(10) The ECU 7 controls the motor M on the basis of the operation of the first operated one (for example, the side switch 8) of the side switch 8 and the rear switch 9, and thereafter disables the operation of the other operation switch (for example, the rear switch 9) until the priority termination conditions are satisfied. Therefore, the operation of the first operated operation switch is given priority so that abnormal operation caused by operating the other operation switch, for example, is limited.

(11) Because the priority termination conditions include a time termination condition, which is satisfied if the preset time (for example, three minutes) has elapsed, the operation of the other operation switch is disabled until the preset time (for example, three minutes) has elapsed. Accordingly, for example, the operation of the first operated operation switch is given priority so that the abnormal operation is limited. Further, if the state where the restriction is cancelled is continued over the preset time (for example, three minutes) due to any abnormality such as fixation of the operation switch, the other operation switch is operated so that restriction by the lock mechanism 4 is performed.

(12) In the case where the restriction by the lock mechanism 4 is cancelled on the basis of the operation of the operation switch (the side switch 8 or the rear switch 9), if the forced restriction conditions except for the operation of the operation switch are satisfied, the motor M is controlled by the ECU 7 such that the restriction by the lock mechanism 4 is performed regardless of the operation of the operation switch (forced restriction control). Specifically, in the present embodiment, the forced restriction conditions correspond to emergency conditions, which are satisfied if the vehicle collision is detected or if it is determined that the vehicle collision is likely to be caused. Accordingly, the restriction by the lock mechanism 4 is immediately performed in case of such an emergency so that the seat 1 is fixed.

(13) If the forced restriction conditions (emergency conditions) are satisfied, the notifier 14 is operated to be in the notifying mode so that the notifier 14 notifies of the state. This facilitates the occupant to recognize that the forced restriction conditions (emergency conditions) are satisfied.

The above described embodiment may be modified as follows.

The cancellation conditions (refer to step S11 in FIG. 2) of the above described embodiment may be changed to other cancellation conditions. For example, the cancellation conditions may correspond to seat cancellation conditions that are satisfied if no occupant is seated on the seat 1 when the rear switch 9 is operated (refer to FIG. 6).

Figure 6:
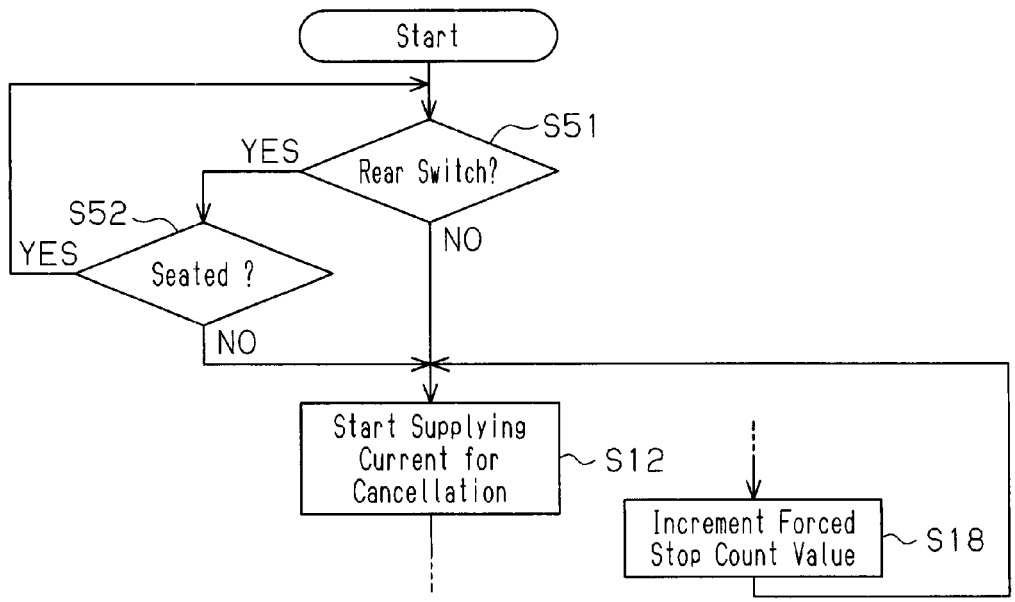
FIG. 6 is a flowchart for illustrating a process executed by an ECU of another embodiment.

That is, when the operation switch (the side switch 8 or the rear switch 9) is being pushed to cancel the restriction by the lock mechanism 4, the ECU 7 determines whether or not the operated operation switch is the rear switch 9 in step S51 as shown in FIG. 6. If the operated operation switch is not the rear switch 9 (namely, the operated operation switch is the side switch 8), the process proceeds to above step S12 (hereinafter, refer to FIG. 2). If the operated operation switch is the rear switch 9, the process of the ECU 7 proceeds to step S52. In step S52, the ECU 7 determines whether or not the occupant is seated on the seat 1 on the basis of the information detected by the seat detection sensor 10. If the ECU 7 determines that the occupant is not seated on the seat 1, the process proceeds to above step S12 (hereinafter, refer to FIG. 2). If the occupant is seated, the process returns to step S51.

Accordingly, even if the rear switch 9 is operated, the state where the restriction by the lock mechanism 4 is performed is maintained until the occupant seated on the seat 1 becomes absent. Therefore, for example, the abrupt sliding of the seat 1 caused by operating the rear switch 9 from behind (with respect to the seated occupant) is limited.

The restriction conditions (refer to step S41 in FIG. 5) of the above described embodiment may be changed to other restriction conditions.

Figure 7:
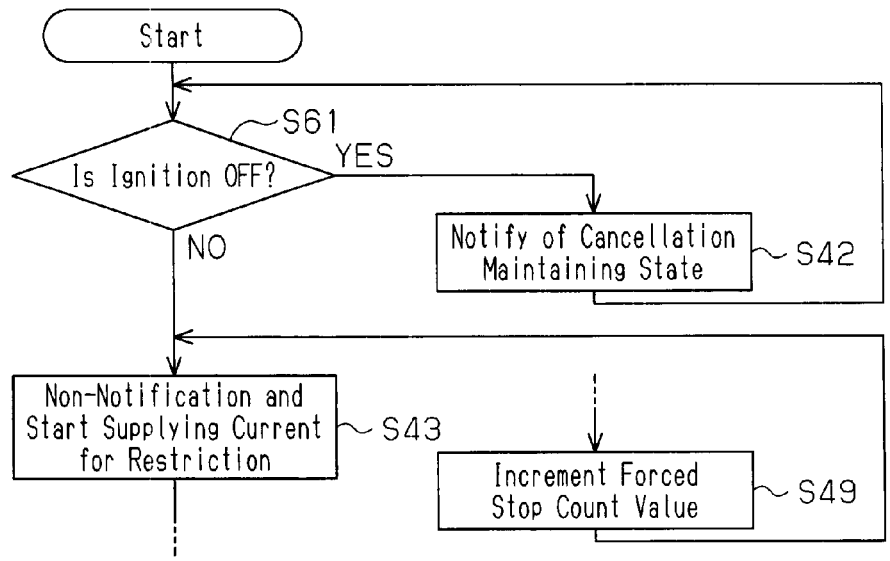
FIG. 7 is a flowchart for illustrating a process executed by the ECU of the other embodiment.

For example, the restriction conditions may correspond to ignition restriction conditions that are satisfied if the ignition is turned ON in the case where the ignition is OFF when the operation switch is operated (refer to FIG. 7).

That is, when the hand is taken off the side switch 8 (when the side switch 8 is automatically restored to its original position) in the state where the restriction by the lock mechanism 4 is cancelled and the supply of current to the motor M is stopped, the ECU 7 determines whether the ignition is OFF or not (namely, ON) on the basis of the information detected by the ignition sensor 15 in step S61. If the ECU 7 determines that the ignition is OFF, the process proceeds to above step S42. In step S42, the ECU 7 operates the notifier 14 to be in the notifying mode to allow the notifier 14 to notify of the state (for example, the fact that the canceled state is still maintained), and the process returns to above step S61. If the ECU 7 determines that the ignition is ON in step S61, the process proceeds to above step S43 (hereinafter, refer to FIG. 5).

Accordingly, the state where the restriction by the lock mechanism 4 is cancelled is maintained until the ignition is turned ON even if the hand is taken off the side switch 8. Therefore, for example, even in the state where the operation switch is not operated, the seat 1 is freely moved until the ignition is turned ON so that the convenience is improved.

Figure 8:
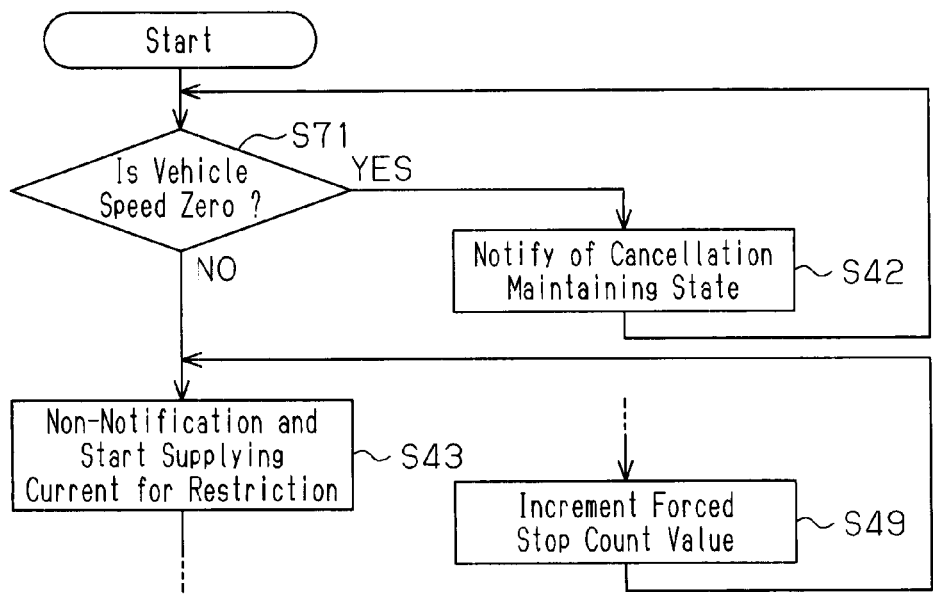
FIG. 8 is a flowchart for illustrating a process executed by the ECU of the other embodiment.

For example, the restriction conditions may correspond to the vehicle speed restriction conditions that are satisfied in the case where the vehicle speed becomes not zero if the vehicle speed has been zero when the operation switch has been operated (refer to FIG. 8).

That is, when the hand is taken off the side switch 8 (when the side switch 8 is automatically restored to its original position) in the state where the restriction by the lock mechanism 4 is cancelled and the supply of current to the motor M is stepped, the ECU 7 determines whether or not the vehicle speed detected by the vehicle speed sensor 11 is zero in step S71. If the ECU 7 determines that the vehicle speed is zero, the process proceeds to above step S42. In step S42, the ECU 7 operates the notifier 14 to be in the notifying mode to allow the notifier 14 to notify of the state (for example, the fact that the canceled state is still maintained), and the process returns to above step S71. If the ECU 7 determines that the vehicle speed is not zero in step S71, namely determines that the vehicle is running, the process proceeds to above step S43 (hereinafter, refer to FIG. 5).

Accordingly, even if the hand is taken off the side switch 8, the state where the restriction by the lock mechanism 4 is cancelled is maintained until the vehicle speed becomes not zero, namely the vehicle moves. Therefore, for example, the seat 1 is freely moved until the vehicle moves even in the state where the operation switch is not operated so that the convenience is improved.

Figure 9:
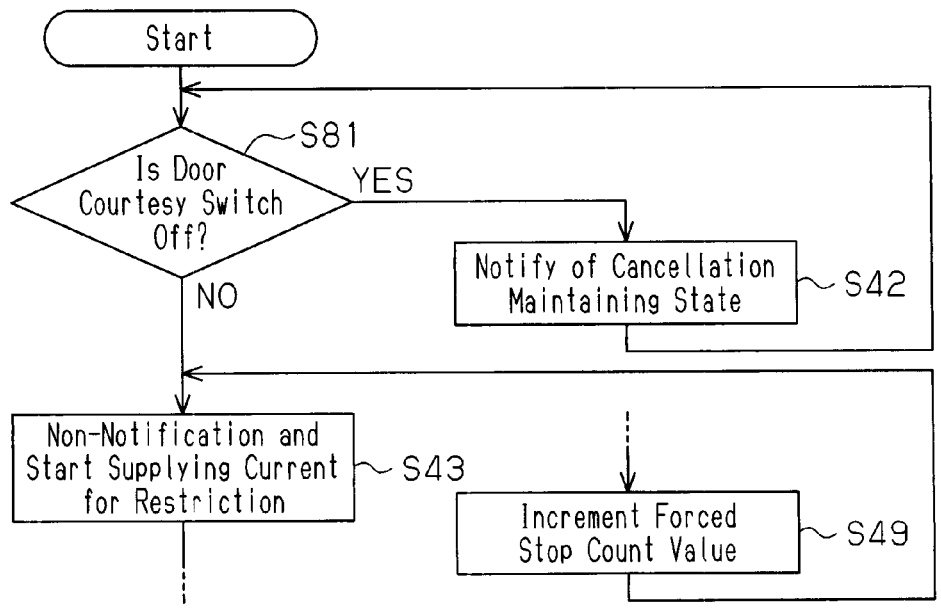
FIG. 9 is a flowchart for illustrating a process executed by the ECU of the other embodiment.

For example, the restriction conditions may correspond to door restriction conditions that are satisfied in the case where the vehicle door is brought into the closed state if the vehicle door has been in the opened state when the operation switch has been operated (refer to FIG. 9).

That is, when the hand is taken off the side switch 8 in the state where the restriction by the lock mechanism 4 is cancelled and the supply of current to the motor M is stopped, the ECU 7 determines whether the vehicle door is in the opened state (off) or in the closed state (on) on the basis of the information detected by the door courtesy switch 16 in step S81. If the ECU 7 determines that the vehicle door is in the opened state (off), the process proceeds to above step S42. In step S42, the ECU 7 operates the notifier 14 to be in the notifying mode to allow the notifier 14 to notify of the state (for example, the fact that the canceled state is still maintained), and the process returns to above step S81. If the ECU 7 determines that the vehicle door is in the closed state (on) in step S81, the process proceeds to above step S43 (hereinafter, refer to FIG. 5).

Accordingly, even if the hand is taken off the side switch 8, the state where the restriction by the lock mechanism 4 is cancelled is maintained until it is detected that the vehicle door is in the closed state. Therefore, for example, the seat 1 is freely moved until it is detected that the vehicle door is in the closed state even in the state where the operation switch is not operated so that the convenience is improved.

Figure 10:
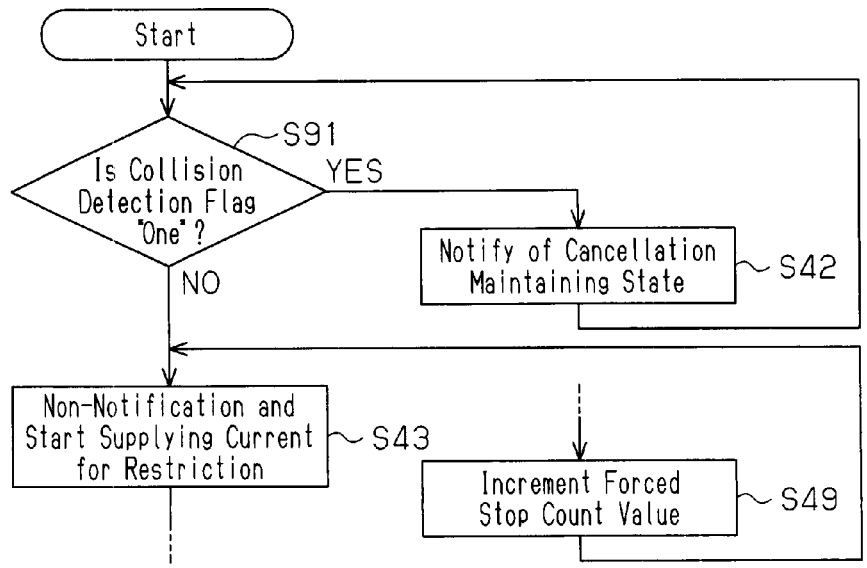
FIG. 10 is a flowchart for illustrating a process executed by the ECU of the other embodiment.

For example, the restriction conditions may correspond to post collision restriction conditions that are satisfied in the case where a flag of the collision detection is reset if the collision has been detected when the operation switch has been operated (refer to FIG. 10).

That is, when the hand is taken off the side switch 8 (when the side switch 8 is automatically restored to its original position) in the state where the restriction by the lock mechanism 4 is cancelled and the supply of current to the motor is stopped, the ECU 7 determines whether or not the vehicle collision has been detected by the collision detection sensor 12 in step S91. If the ECU 7 determines that the vehicle collision has been detected, the process proceeds to above step S42. It is determined whether or not the vehicle collision has been detected by the collision detection sensor 12 according to the collision detection flag. Specifically, it is determined whether the collision detection flag, which is set as "one" when the vehicle collision is detected, is "one" or not (namely "zero"). If the ECU 7 determines that the collision detection flag is "one", the process proceeds to above step S42. The collision detection flag is maintained as "one" until it is reset in a maintenance factory, for example. If the collision detection flag is reset, it is set as "zero". In step S42, the ECU 7 operates the notifier 14 to be in the notifying mode so that the notifier 14 notifies of the state (for example, the fact that the canceled state is still maintained), and the process returns to above step S91. If the ECU 7 determines that the vehicle collision has not been detected, namely the collision detection flag is "zero" in step S91, the process proceeds to above step S43 (hereinafter, refer to FIG. 5).

Accordingly, even if the hand is taken off the side switch 8, the state where the restriction by the lock mechanism 4 is cancelled is maintained if the collision has been detected (until the collision detection flag is reset). Therefore, for example, the seat 1 is freely moved if the collision has been detected even in the state where the operation switch is not operated so that the convenience is improved.

The forced restriction conditions (refer to step S31 in FIG. 4) of the above described embodiment may be changed to other forced restriction conditions.

Figure 11:
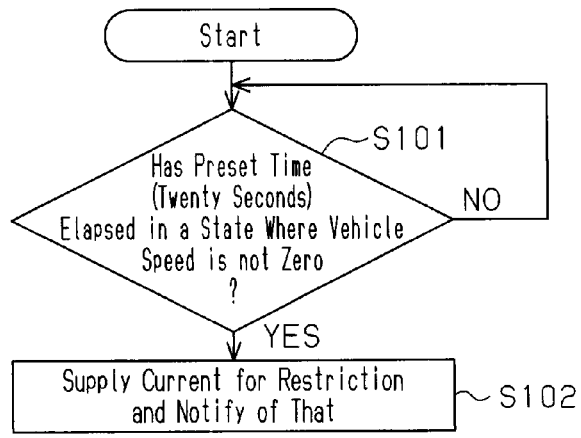
FIG. 11 is a flowchart for illustrating a process executed by the ECU of the other embodiment.

For example, the forced restriction conditions may correspond to time lapse forced restriction conditions that are satisfied if a preset time (for example, 20 seconds) elapses after the restriction by the lock mechanism 4 is cancelled in the state where the vehicle speed is not zero (refer to FIG. 11).

That is, when it is detected that the restriction has been cancelled in above step S13 (refer to FIG. 2), the ECU 7 starts a process shown in FIG. 11 in parallel with the process in step S14.

As shown in FIG. 11, in step S101, the ECU 7 determines whether or not the preset time (for example, twenty seconds) has elapsed since the restriction was cancelled in the state where the vehicle speed is not zero. If the ECU 7 determines that the preset time (for example, twenty seconds) has elapsed in the state where the vehicle speed is not zero, the process proceeds to step S102. If the preset time (for example, twenty seconds) has not elapsed in the state where the vehicle speed is not zero, step S101 is repeated.

In step S102, the ECU 7 supplies the current to the motor M such that the output portion moves in the reverse direction as a direction in which the restriction by the lock mechanism 4 is performed so that the restriction by the lock mechanism 4 is performed, and operates the notifier 14 to be in the notifying mode so that the notifier 14 notifies of the state (for example, the restriction by the lock mechanism 4 is performed).

Accordingly, when the preset time (for example, twenty seconds) has elapsed in the state where the vehicle speed is not zero, the restriction by the lock mechanism 4 is performed so that the seat 1 is fixed. Therefore, the state where the restriction is cancelled while the vehicle is running for a long time (for example, longer than twenty seconds) is forcibly restricted from being continued.

In the above embodiment, the seat 1 is provided in a slidable manner along the lower rail, which extends in the vehicle front back direction, and the lock mechanism 4 restricts the sliding movement thereof in the vehicle front back direction. The direction of the sliding movement is not limited to this.

For example, the seat 1 may be embodied in a slidable manner in each of the vehicle front back direction and the vehicle width direction. In this case, for example, the lock mechanism 4 is configured to include a front back direction lock mechanism for restricting the sliding movement of the seat 1 in the vehicle front back direction, a width direction lock mechanism for restricting the sliding movement of the seat 1 in the vehicle width direction, and a front back direction operation switch and a width direction operation switch as operation switches respectively corresponding to the mechanisms. In this case, the ECU 7 may control the motor M on the basis of the operation of the first operated one of the front back direction operation switch and the width direction operation switch, and thereafter disable the operation of the other operation switch until direction priority termination conditions are satisfied. The direction priority termination conditions correspond to, for example, time termination condition, which is satisfied if a preset time (for example, three minutes) has elapsed, as well as the priority termination conditions. Accordingly, for example, the operation of the first operated one of the front back direction operation switch and the width direction operation switch is given priority so that the cancellation of the restriction by the front back direction lock mechanism and the cancellation of the restriction by the width direction lock mechanism are restricted from being performed simultaneously. The front back direction operation switch and the width direction operation switch may be configured to be arranged on the lateral surface of the seat cushion 2 (including side switches) and the rear surface of the seat back 3 (including rear switches), or only one of the switches may be configured to be arranged thereon.

In this case, the motor M (drive source) drives the output portion selectively in two directions, namely the forward and the reverse directions. The motor M may be provided such that it drives the output portion in the forward direction from a neutral position to cancel the restriction by the front back direction lock mechanism and drives the output portion in the reverse direction from the neutral position to cancel the restriction by the width direction lock mechanism. Accordingly, each of the restrictions by the two lock mechanisms (the front back direction lock mechanism and the width direction lock mechanism) is cancelled, and the number of the motor M (drive source) is reduced (to one) in comparison to the case where the drive source is provided for each of the two lock mechanisms. The motor M (drive source) is generally heavy and of high cost. Accordingly, the number of the motor M (drive source) is reduced so that the weight and the cost of the seat 1 to be mounted are reduced, for example.

Figure 12:
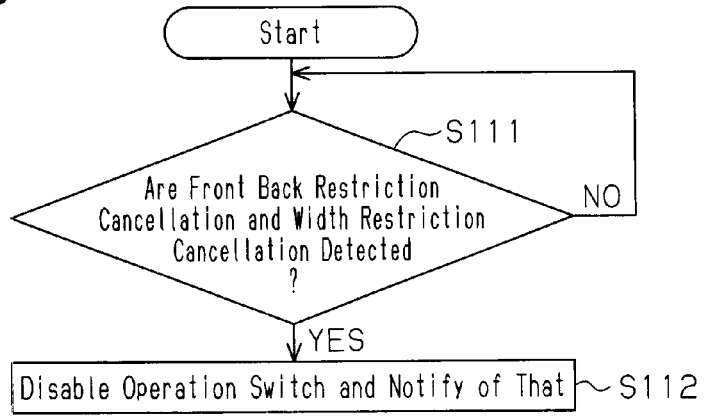
FIG. 12 is a flowchart for illustrating a process executed by the ECU of the other embodiment.

In this case, the cancellation detection portion (cancellation limit switch 5) may be configured to include a front back direction cancellation limit switch (front back direction cancellation detection portion), which detects that the restriction by the front back direction lock mechanism is cancelled, and a width direction cancellation limit switch (width direction cancellation detection portion), which detects that the restriction by the width direction lock mechanism is cancelled. The ECU 7 may be configured to disable the operations of the operation switches (the front back direction operation switch and the width direction operation switch) after the front back direction cancellation limit switch and the width direction cancellation limit switch detect that the restrictions are simultaneously cancelled. If the front back direction cancellation limit switch and the width direction cancellation limit switch detect that the restrictions are simultaneously cancelled, the ECU 7 may be configured to operate the notifier 14 to be in the notifying mode to allow the notifier 14 to notify of the state. Specifically, for example, if the operation switch (the front back direction operation switch or the width direction operation switch) is operated, the ECU 7 starts a process shown in FIG. 12 in parallel with the process of the normal operations (for example, refer to FIG. 2 or FIG. 5). If the front back direction cancellation limit switch and the width direction cancellation limit switch detect that the restrictions are simultaneously cancelled in step S111, the process proceeds to step 5112 in which the ECU 7 disables the operations of the operation switches (the front back direction operation switch and the width direction operation switch), and operates the notifier 14 to be in the notifying mode to allow the notifier 14 to notify of the state. If it is not detected that the restrictions are simultaneously cancelled, step S111 is repeated.

Accordingly, after it is detected that the restrictions are simultaneously cancelled, operations of the operation switches (the front back direction operation switch and the width direction operation switch) are disabled. Therefore, the current is prevented from being supplied to the motor M in the state where certain failure is caused (in the state where the restrictions are simultaneously cancelled although the device is normally configured such that only one of restriction by the front back direction lock mechanism and the restriction by the width direction lock mechanism is cancelled). The notifier 14 is operated to be in the notifying mode to be allowed to notify of the state. This facilitates the occupant to recognize that certain failure is caused.

Although this is not referred to in the above described embodiment, if the above emergency conditions are satisfied, namely if it is determined that the vehicle collision is detected or the vehicle collision is likely to be caused in step S31 shown in FIG. 4, the ECU 7 may control the motor M such that the restriction by the lock mechanism 4 is performed faster than usual. The motor M is normally driven at an optimum speed in consideration of various effects such as a noise and a vibration of the motor M. In contrast, if the emergency conditions are satisfied, the motor M is driven at a speed faster than usual even if the noise and the vibration are increased.

Accordingly, in case of emergency, the restriction by the lock mechanism 4 is more immediately performed so that the seat 1 is fixed.

In the above described embodiment, the cancellation detection portion and the restriction detection portion correspond to the limit switches (the cancellation limit switch 5 and the restriction limit switch 6). The detection portions are riot limited to these. The cancellation detection portion may be other cancellation detection portions that detect that the restriction by the lock mechanism 4 is cancelled. The restriction detection portion may be other restriction detection portions that detect that the restriction by the lock mechanism 4 is performed. For example, the cancellation detection portion and the restriction detection portion may be the rotation sensor S or the lock current detection portion. When the rotation sensor S is used as the detection portions, it may be detected that the restriction is cancelled or the restriction is performed on the basis of the number of pulses supplied from the rotation sensor S, for example. Alternatively, it may be detected that the restriction is cancelled or the restriction is performed on the basis of the time that elapses after the pulses stop (that is, it is determined that the device is mechanically stopped). When the lock current detection portion is used as the detection portions, for example, a current value of the supplied current is detected so that it may be detected that the restriction is cancelled or the restriction is performed on the basis of the current value (that is, when the current becomes the lock current, it is determined that the device is mechanically stopped). A timer may be used as the cancellation detection portion and the restriction detection portion, for example. In this case, however, the forced stop conditions (time lapse forced stop condition, which is satisfied if the preset time has elapsed) in the above described embodiment cannot be adopted.

In the above described embodiment, the forced stop conditions correspond to the time lapse forced stop condition, which is satisfied if the preset time has elapsed. The forced stop conditions are not limited to these. The forced stop conditions may correspond to other conditions. For example, the forced stop conditions may correspond to number of rotations excess forced stop conditions that are satisfied if the number of the pulses supplied from the rotation sensor S exceeds a preset number. Accordingly, even if certain failure is caused in the cancellation detection portion and the restriction detection portion (such as the cancellation limit switch 5 and the restriction limit switch 6), the current is restricted from continuing to flow into the motor M by satisfying the number of rotations excess forced stop conditions that are satisfied if the number of the pulses supplied from the rotation sensor S exceeds the preset number.

Although this is not especially referred to in the above described embodiment, the seat 1 may include an ottoman.

The ECU 7 may be configured such that the ottoman is accommodated when the restriction is cancelled on the basis of the operation of the operation switch. Accordingly, in the case where the restriction is cancelled, the ottoman does not interfere with the seat 1 when the seat 1 is allowed to slide.

Although this is not especially referred to in the above described embodiment, the ECU 7 may be configured to control the motor M such that the restriction by the lock mechanism 4 is cancelled regardless of the operation of the operation switch when the seat back 3 is tilted forward (that is, the seat back 3 is completely turned down). The ECU 7 may be configured to control the motor M such that the restriction by the lock mechanism 4 is performed regardless of the operation of the operation switch when the seat back 3 is turned up thereafter. This facilitates the occupant seated on the seat behind the seat back to exit the vehicle through the front vehicle door, for example, so that the convenience is improved.

The above described embodiment and each of other embodiments may be not only modified but also combined.

Second Embodiment

Hereinafter, a vehicle seat device according to a second embodiment of the present invention will be described with reference to FIGS. 13 through 18. In the first embodiment, the restriction by the lock mechanism 4 and the cancellation thereof are performed by the control of the ECU 7. In the second embodiment, the restriction by the lock mechanism 4 and the cancellation thereof are achieved by an electromechanical configuration without depending on the control of the ECU 7. Hereinafter, like or the same reference numerals are given to those components that are like or the same as the corresponding components of the first embodiment, and detailed explanations are omitted.

Figure 13:
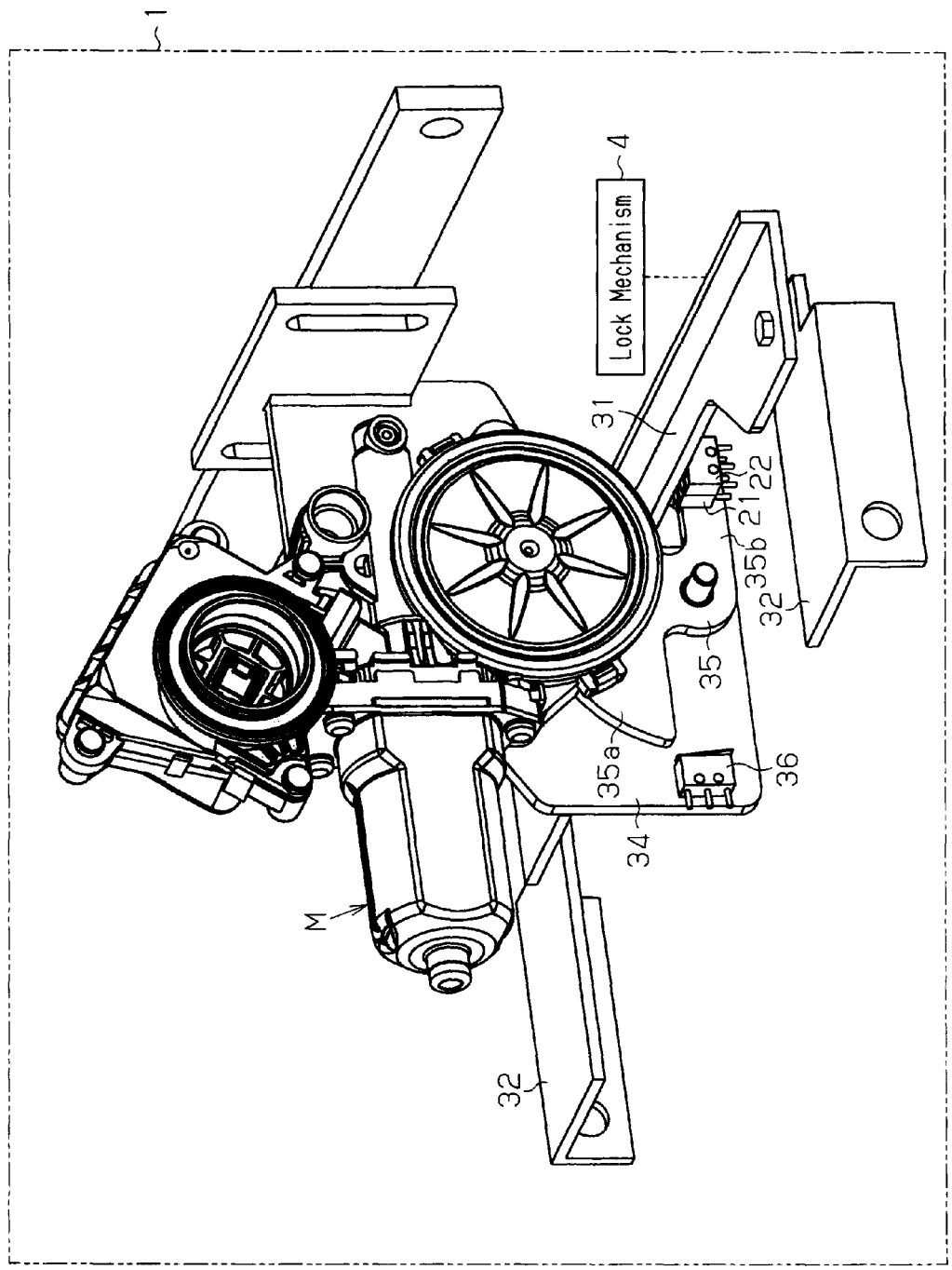
FIG. 13 is a perspective view for illustrating a mechanical structure of a vehicle seat device according to a second embodiment of the present invention.

As shown in FIG. 13, a motor M as a drive source for canceling restriction by a lock mechanism 4 is provided in a seat 1 for a vehicle. The seat 1 of the present embodiment is provided in a moveable manner along a lower rail, which is not shown and is fixed to a vehicle floor and extends in the vehicle front back direction. The lock mechanism 4 restricts the movement of the seat 1. The lock mechanism 4 is publicly known, and, specifically, restricts the movement of the seat 1 by inserting a lock pawl formed on the seat 1 in any of a plurality of lock holes formed in the lower rail.

Figure 14:
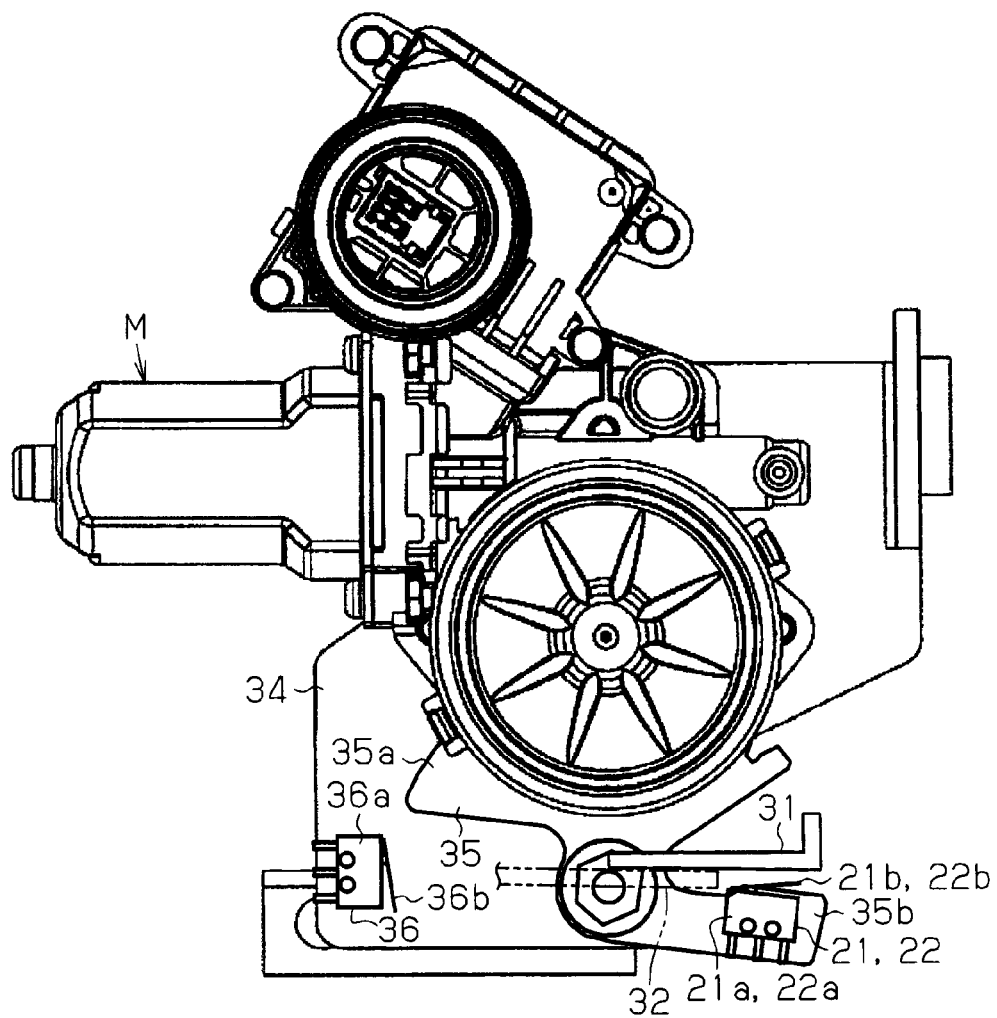
FIG. 14 is a lateral view for illustrating a mechanical operation of the vehicle seat device according to the second embodiment.
Figure 17:
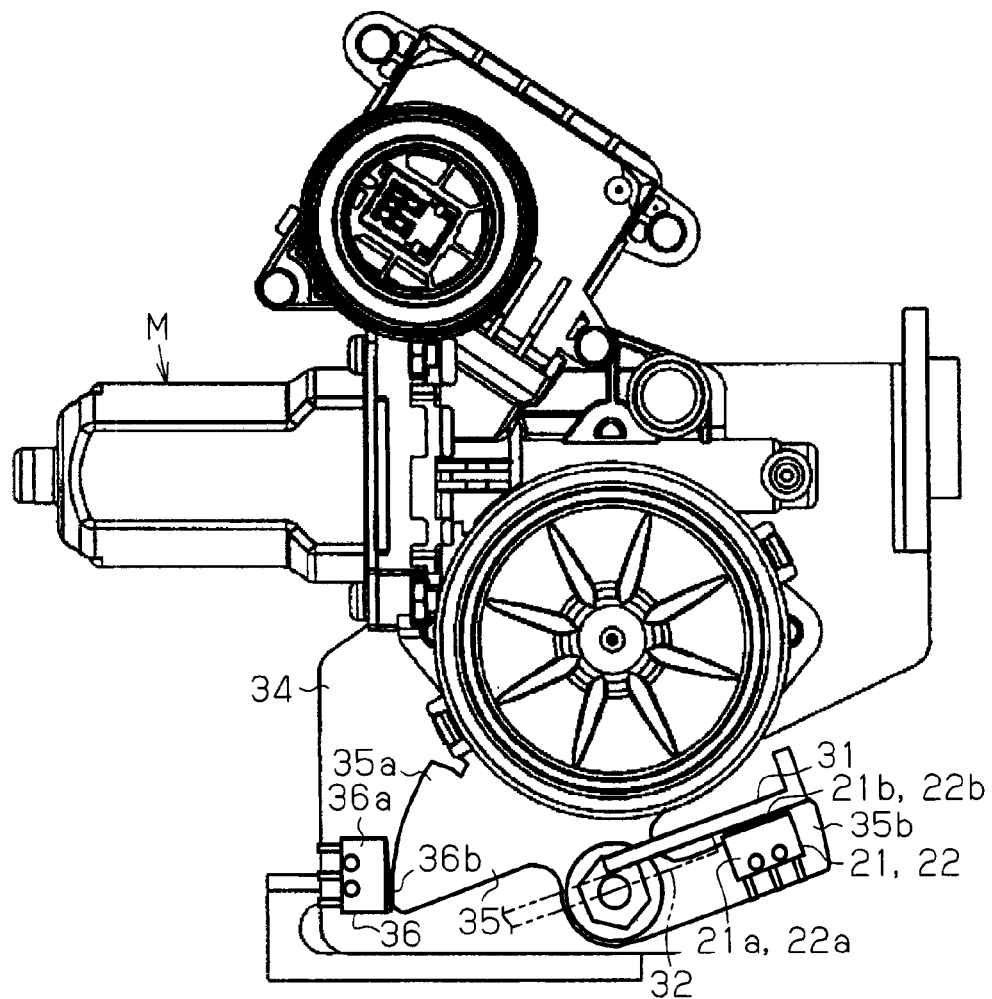
FIG. 17 is a lateral view for illustrating the mechanical operation of the vehicle seat device according to the second embodiment.

The motor M is fixed onto a frame of the seat 1 via a bracket 34 formed of a metal plate material. The motor M sets an output member 35 as an output portion rotatable in the forward or the reverse direction in accordance with the direction in which the current is supplied. The output member 35 is formed of a metal plate material, and is supported by the bracket 34 in a rotational manner. A sector gear portion 35a with a substantially sectorial shape, namely a partial circular shape is formed in the output member 35. A sector gear of the sector gear portion 35a engages with the output rotational axis of the motor M so that the output member 35 rotates according to the drive of the motor M. An output strip 35b is formed in the output member 35, which extends therefrom. The output strip 35b is provided such that it rotates between a position, which is slightly slanted downward (about five degrees) with respect to a horizontal surface as shown in FIG. 14, and a position, which is slanted upward (about twenty degrees) with respect to the horizontal surface as shown in FIG. 17. The motor M has a self-constriction force by which the movement (rotation) of the output member 35 is limited in the non-current supplied state.

Figure 15:
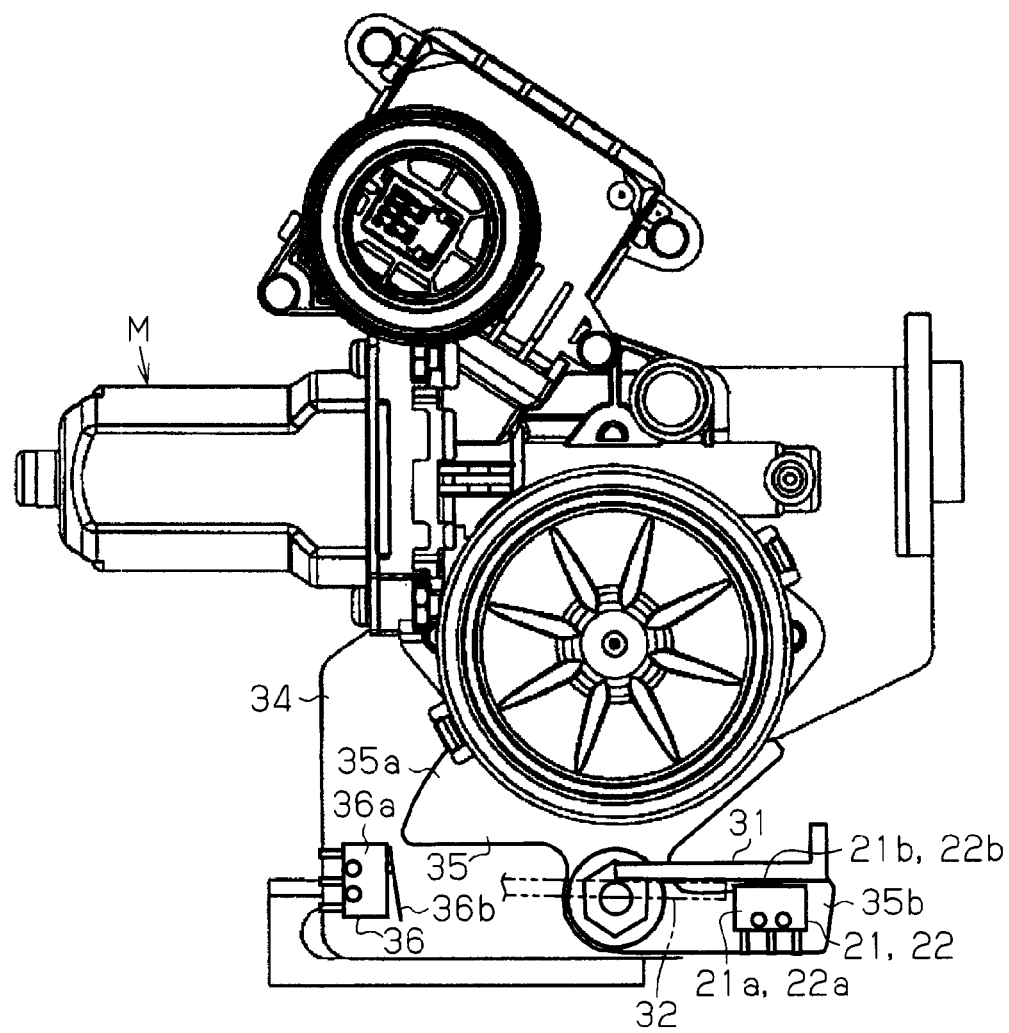
FIG. 15 is a lateral view for illustrating the mechanical operation of the vehicle seat device according to the second embodiment.
Figure 16:
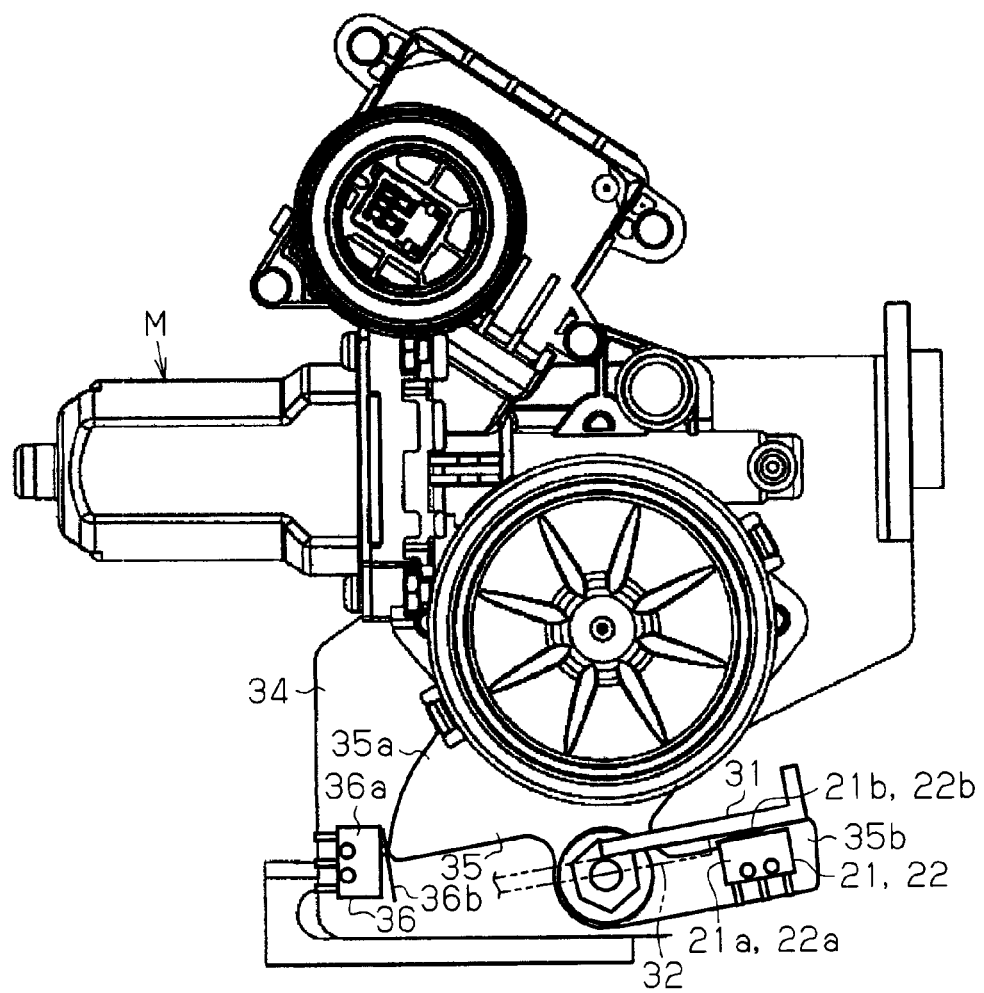
FIG. 16 is a perspective view for illustrating the mechanical operation of the vehicle seat device according to the second embodiment.

The restriction by the lock mechanism 4 and the cancellation thereof are switched at a restriction/cancellation position of the output member 35 (refer to FIG. 16). A first limit switch 36 as a first switch element switched at a first switch position (refer to FIG. 17) in the more forward direction than the restriction/cancellation position (refer to FIG. 16) of the output member 35 is provided in the seat 1. Second limit switches 21 and 22 as second switch elements switched at a second switch position (refer to FIG. 15) in the reverse direction from the restriction/cancellation position (refer to FIG. 16) are provided in the seat 1. The first limit switch 36 and the second limit switches 21, and 22 are turned ON during a period in which levers 36b, 21b, and 22b, which extend from switch body portions 36a, 21a, and 22a, are pushed.

More specifically, a cancellation lever 31 as a cancellation member, which can cancel the restriction by the lock mechanism 4, is connected through a lock mechanism connection portion 32 to the lock mechanism 4. The cancellation lever 31 is connected to the lock mechanism 4 such that the cancellation lever 31 does not cancel the restriction by the lock mechanism 4 in the substantially horizontal state as shown in FIGS. 13 to 15, and cancels the restriction by the lock mechanism 4 in the state where the cancellation lever 31 is raised with the lock mechanism connection portion 32 as shown in FIGS. 16 and 17, namely the lock pawl is pulled out of the lock hole. As shown in FIGS. 13 to 15, the cancellation lever 31 is set such that it does not mechanically move downward with respect to the substantially horizontal state, namely is not brought into a downward slanted state.

The output member 35 (output strip 35b) is provided such that it engages with the cancellation lever 31 via the second limit switches 21 and 22 at the second switch position (the output strip 35b is in the substantially horizontal state) as shown in FIG. 15, and is brought into disengaged state at a position in the reverse direction from the second switch position as shown in FIG. 14. The second limit switches 21 and 22 are arranged such that the levers 21b and 22b thereof raise the cancellation lever 31 upward with the output strip 35b, namely they are pressed against the cancellation lever 31 within a range shown in FIGS. 15 to 17. In the state where the power transmission is performed as described above, the levers 21b and 22b are ensured to be pushed (ON state). In the present embodiment, a pair of the second limit switches 21 and 22 is arranged in parallel such that they are simultaneously switched, more specifically, the levers 21b and 22b are brought into simultaneously pushed state (ON state).

The first limit switch 36 is arranged on the bracket 34 at a position corresponding to the sector gear portion 35a such that the lever 36b thereof is pushed into the sector gear portion 35a (ON state) at the first switch position as shown in FIG. 17, namely a position in which the output strip 35b is slanted upward about twenty degrees with respect to the horizontal surface.

Next, an electric circuit of the vehicle seat device according to the second embodiment will be described according to FIG. 18.

Figure 18:
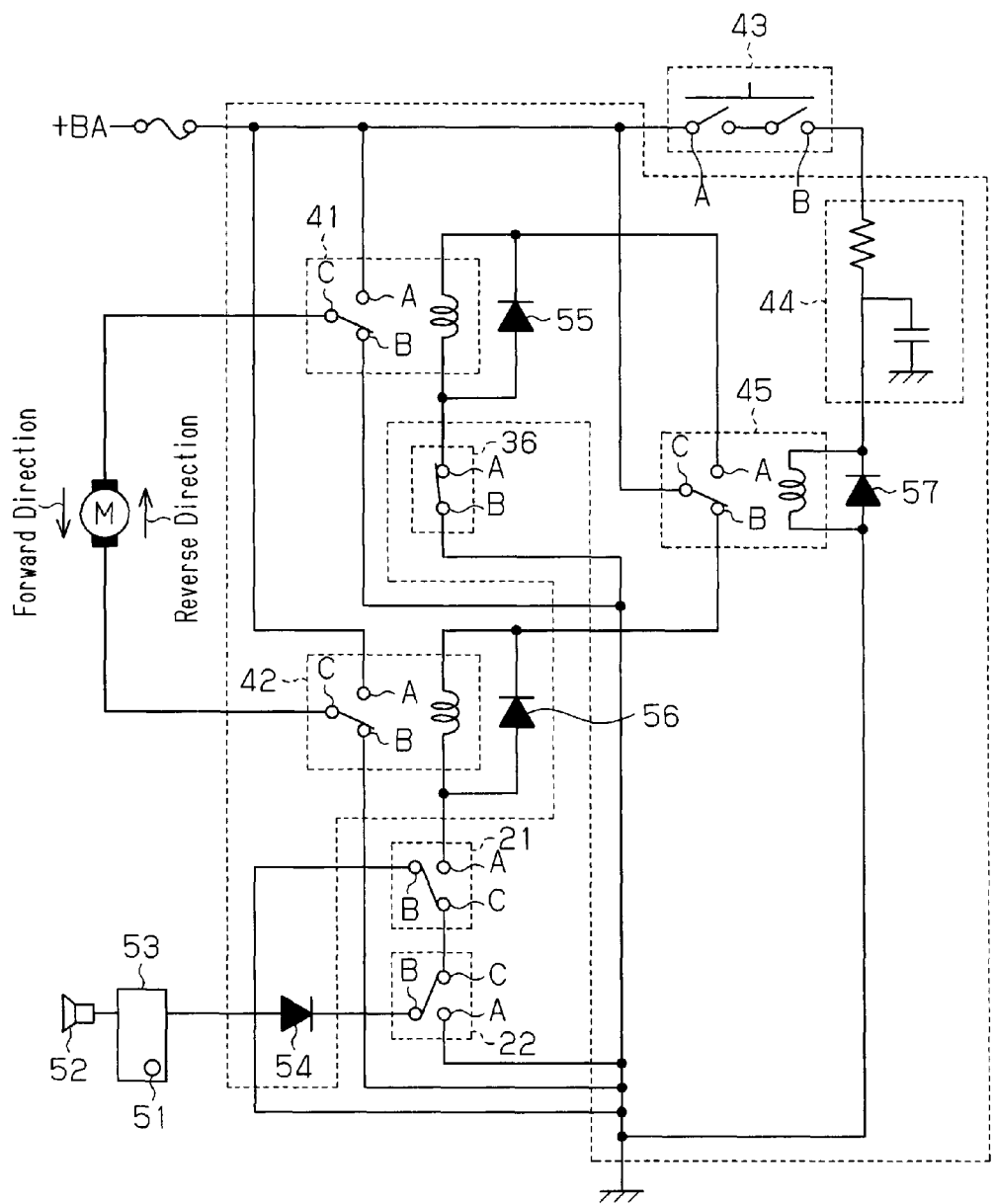
FIG. 18 is a view illustrating an electric circuit of the vehicle seat device according to the second embodiment.

As shown in FIG. 18, a pair of power supply terminals of the motor M is connected to a common contact point C of each of a forward rotation relay 41 and a reverse rotation relay 42. A contact point A of each of the forward rotation relay 41 and the reverse rotation relay 42 is connected to a DC power supply (battery) BA, and each contact point B is connected to a ground.

An operation switch 43 is provided on a lateral surface of a seat cushion in the seat 1, for example. The operation switch 43 corresponds to an automatic restoration type push-button switch. A contact point A and a contact point B of the operation switch 43 are connected to each other during a period in which the operation of pushing the operation switch 43 is made to cancel the restriction by the lock mechanism 4.

The contact point A of the operation switch 43 is connected to the DC power supply BA. The contact point B of the operation switch 43 is connected through a chattering prevention circuit 44 to an end of a coil of a relay 45. The other end of the coil is connected to the ground.

A common contact point C of the relay 45 is connected to the DC power supply BA, and a contact point A of the relay 45 is connected to an end of a coil of the forward rotation relay 41. The other end of the coil is connected through the first limit switch 36 to the ground. The first limit switch 36 brings a contact point A and a contact point B of the first limit switch 36 into a non-connected state in the ON state in which the lever 36b is pushed. The first limit switch 36 brings the contact point A and the contact point B of the first limit switch 36 into a connected state in the OFF state in which the lever 36b is not pushed.

A contact point B of the relay 45 is connected to an end of a coil of the reverse rotation relay 42. The other end of the coil is connected through the second limit switches 21 and 22 to the ground. The second limit switches 21 and 22 bring each common contact point C and each contact point A into a connected state in the ON state in which the lever 36b is pushed, and bring the contact point C and each contact point B into a connected state in the OFF state. The other end of the coil of the reverse rotation relay 42 is connected to the contact point A of the second limit switch 21, the contact point C of the second limit switch 21 is connected to the contact point C of the other second limit switch 22, and the contact point A of the second limit switch 22 is connected to the ground.

The vehicle seat device of the second embodiment includes an indicator 51 and a buzzer 52 as notifiers for notifying of a state where the restriction by the lock mechanism 4 is cancelled. The indicator 51 of the second embodiment corresponds to an alert lamp provided in a part of a meter 53, which shows various indications. The indicator 51 and the buzzer 52 are connected through a diode 54 to the contact point B of the second limit switch 22. The contact point B of the second limit switch 21 is connected to the ground. The indicator 51 and the buzzer 52 are disabled in the state where they are connected to the ground. When they are brought into an electrically open state, they are enabled to visually and audibly make a notification for an occupant.

Flywheel diodes 55 to 57 are respectively connected to the opposite ends of the coil of the forward rotation relay 41, the opposite ends of the coil of the reverse rotation relay 42, and the opposite ends of the coil of the relay 45 in parallel.

Next, the operation of the vehicle seat device as configured above will be described.

During a period in which the occupant pushes the operation switch 43 to perform the operation of cancelling the restriction by the lock mechanism 4, the current flows through the operation switch 43 and the chattering prevention circuit 44 into the coil of the relay 45 to bring the relay 45 into the ON state (state where the contact point C is connected to the contact point A). Then, the current flows through the relay 45 into the coil of the forward rotation relay 41 to bring the forward rotation relay 41 into the ON state (state where the contact point C is connected to the contact point A). Then, the drive current is supplied through the forward rotation relay 41 to the motor M in the forward direction (downward in FIG. 18), namely the current for rotating the output member 35 in the forward direction is supplied so that the output member 35 is rotated in the forward direction.

When the output member 35 rotates from the state disengaged from the cancellation lever 31 (refer to FIG. 14) to the second switch position as shown in FIG. 15 so that the output member 35 is engaged with the cancellation lever 31, the second limit switches 21 and 22 are turned ON. Thereby, the indicator 51 and the buzzer 52 are brought into the electrically open state to be enabled so that they visually and audibly make a notification for the occupant.

When the output member 35 further rotates in the forward direction to the restriction/cancellation position shown in FIG. 16, the cancellation lever 31 is raised with the lock mechanism connection portion 32 so that the restriction by the lock mechanism 4 is cancelled.

When the output member 35 further rotates in the forward direction to the first switch position shown in FIG. 17, the first limit switch 36 is turned ON (state where the contact point A and the contact point B are disconnected). Thereby, the current no longer flows into the coil of the forward rotation relay 41 so that the forward rotation relay 41 is brought into the OFF state (state where the contact point C is connected to the contact point B). Then, the supply of the drive current to the motor M, i.e., the supply of the current is stopped. That is, during a period in which the operation switch 43 is pushed, the first limit switch 36 serves to supply the current to the motor M to rotate the output member 35 in the forward direction until the first limit switch 36 is turned ON, and stop supplying the current to the motor M when the first limit switch 36 is turned ON.

Thereafter, for example, after the occupant adjusts the position of the seat 1 in the vehicle front back direction, when the operation of cancelling the restriction by the lock mechanism 4 is completed by leaving the hand off the operation switch 43, the current no longer flows into the coil of the relay 45 so that the relay 45 is brought into the OFF state (state where the contact point C is connected to the contact point B). Then, the current flows through the relay 45 into the coil of the reverse rotation relay 42 to bring the reverse rotation relay 42 into the ON state (state where the contact point C is connected to the contact point A). Then, the drive current is supplied through the reverse rotation relay 42 to the motor M in the reverse direction (upward in FIG. 18), namely the current for rotating the output member 35 in the reverse direction is supplied so that the output member 35 is rotated in the reverse direction.

When the output member 35 rotates in the reverse direction from the restriction/cancellation position shown in FIG. 16, the restriction by the lock mechanism 4 is performed. When the output member 35 further rotates in the reverse direction from the second switch position shown in FIG. 15, the second limit switches 21 and 22 are turned OFF (state where the contact point C is connected to the contact point B). Thereby, the current no longer flows into the coil of the reverse rotation relay 42 so that the reverse rotation relay 42 is brought into the OFF state (state where the contact point C is connected to the contact point B). That is, when the pushed state of the operation switch 43 is cancelled, the second limit switches 21 and 22 serve to supply the current to the motor M to rotate the output member 35 in the reverse direction until the second limit switches 21 and 22 are turned OFF, and stop supplying the current to the motor M when the second limit switches 21 and 22 are turned OFF. At this time, the indicator 51 and the buzzer 52 are brought into the state where they are connected to the ground so that they are disabled and the notification is stopped.

The above described second embodiment has the following advantages.

(1) During a period in which the operation of the operation switch 43 to cancel the restriction is performed, the current is supplied to the motor M to rotate the output member 35 in the forward direction until the first limit switch 11 is switched, and the supply of current to the motor M is stopped when the first limit switch 11 is switched. Since the motor M has a self-constriction force, the output member 35 thereof cannot be moved in the non-current supplied state. In contrast, in the current supplied state, even if the operation of the operation switch 43 to cancel the restriction is continued to be performed, namely the operation switch 43 is continued to be pushed, the current supplied to the motor M is intercepted, and the state where the restriction by the lock mechanism 4 is cancelled is maintained.

When the operation of the operation switch 43 to cancel the restriction is stopped, the current is supplied to rotate the output member 35 in the reverse direction until the second limit switches 21 and 22 are switched. When the second limit switches 21 and 22 are switched, the supply of current to the motor M is stopped. Accordingly, the current supplied to the motor M is intercepted after the restriction by the lock mechanism 4 is performed. When the supply of the current to the motor M is controlled by providing the first limit switch 36 and the second limit switches 21 and 22 as described above, the current is restricted from continuing to flow into the motor M so that the low power consumption is achieved by a simple configuration without especially using a microcomputer.

(2) The output member 35 is provided such that it engages with the cancellation lever 31 connected thereto, which can cancel the restriction by the lock mechanism 4, via the second limit switches 21 and 22 at the second switch position, and is brought into disengaged state at a position in the reverse direction from the second switch position. Accordingly, in the state where the power transmission to the cancellation lever 31 is performed, the second limit switches 21 and 22 are ensured to be switched (ON state).

(3) The vehicle seat device includes a notifier (the indicator 51 and the buzzer 52) for notifying of a state where the restriction by the lock mechanism 4 is cancelled. This facilitates the occupant to visually and audibly recognize the state where the restriction by the lock mechanism is cancelled.

(4) The notifier (the indicator 51 and the buzzer 52) is switched between the notifying mode and the non-notifying mode by the second limit switches 21 and 22 such that it is in the notifying mode when the output member 35 is located in the more forward direction than the second switch position. Accordingly, the notifier is operated by using the second limit switches 21 and 22 each serves to stop the supply of the current to the motor M.

The above described second embodiment may be modified as follows.

In the above described second embodiment, the output member 35 is provided such that it engages with the cancellation lever 31 connected thereto, which can cancel the restriction by the lock mechanism 4, via the second limit switches 21 and 22 at the second switch position. The configuration is not limited to this, and may be changed to other configurations. For example, the second limit switches 21 and 22 may be configured to be fixed on the bracket 34 such that the levers 21b and 22b are pushed by the output member 35 as well as the first limit switch 36. In this case, in particular, the cancellation lever 31 may be omitted. For example, the output member 35 may be directly connected to the lock mechanism 4, or connected through a wire to the lock mechanism 4.

In the above described second embodiment, the notifier (the indicator 51 and the buzzer 52), which notifies of the state where the restriction by the lock mechanism 4 is cancelled, is provided. The configuration is not limited to this. The notifier may be omitted. The notifier may include any one of the indicator 51 and the buzzer 52. That is, the notifier may be configured to make a visual and/or audible notification. Alternatively, the notifier may be changed to other configurations other than the indicator 51 and the buzzer 52.

In the above described second embodiment, the notifier (the indicator 51 and the buzzer 52) is switched between the notifying mode and the non-notifying mode by the second limit switches 21 and 22. The configuration is not limited to this. The notifier may be switched between the notifying mode and the non-notifying mode by other switch elements. When the notifier is omitted or is operated by the other switch elements as described above, only one of the second limit switches 21 and 22 may be provided.

The first limit switch 36 and the second limit switches 21 and 22 of the above described second embodiment may be changed to other switch elements as long as they include similar functions. The above described circuit may be modified without using a microcomputer as long as it includes similar functions. For example, each of the elements (the forward rotation relay 41, the reverse rotation relay 42, and the relay 45) may be changed to other elements that include similar functions.

In the above described second embodiment, the lock mechanism 4 restricts the movement of the seat 1 in the vehicle front back direction. The configuration is not limited to this. The lock mechanism 4 may restrict other movements of the seat 1. For example, the lock mechanism 4 may restrict tilting of the seat back, which is pivotal with respect to the seat cushion forming a seat portion of the seat 1.

The invention claimed is:

1. A vehicle seat device comprising
    a lock mechanism, which restricts sliding movement of a seat;
    a drive source having an output portion that is selectively moveable in a forward direction and a reverse direction, wherein the drive source is configured to, in a non-current supplied state, generate self-constriction force to restrict the output portion from being moved, and, in a current supplied state, selectively drive the output portion in two directions, that is, the forward direction, in which restriction is cancelled, and the reverse direction, in which the restriction is performed, in accordance with a direction in which current is supplied such that sliding movement of the seat is restricted by the lock mechanism and the restriction is cancelled based on operation of an operation switch;
    a cancellation detection portion, which detects that the restriction by the lock mechanism is cancelled; and
    a restriction detection portion, which detects that the restriction by the lock mechanism is performed, wherein the vehicle seat device is configured such that
    when cancelling the restriction based on the operation of the operation switch, the current is supplied to the drive source to drive the output portion in the forward direction until the cancellation is detected by the cancellation detection portion, and when the cancellation is detected, the supply of current to the drive source is stopped, and
    when performing the restriction based on the operation of the operation switch, the current is supplied to the drive source to move the output portion in the reverse direction until the restriction is detected by the restriction detection portion, and when the restriction is detected, the supply of current to the drive source is stopped.

2. The vehicle seat device according to claim 1, further comprising a control portion, which controls the supply of the current to the drive source based on detection results obtained from the cancellation detection portion and the restriction detection portion, wherein when cancelling the restriction based on the operation of the operation switch, the control portion supplies the current to the drive source such that the output portion moves in the forward direction until the cancellation is detected by the cancellation detection portion, and when the cancellation is detected, the control portion stops supplying the current to the drive source, and
    when performing the restriction based on the operation of the operation switch, the control portion supplies the current to the drive source such that the output portion moves in the reverse direction until the restriction detection portion detects the restriction, and when the restriction is detected, the control portion stops supplying the current to the drive source.

3. The vehicle seat device according to claim 2, wherein in a case where the current is supplied to the drive source, if preset forced stop conditions except for cancellation detection by the cancellation detection portion and restriction detection by the restriction detection portion are satisfied, the control portion stops supplying the current to the drive source.

4. The vehicle seat device according to claim 3, wherein
    the cancellation detection portion and the restriction detection portion include a limit switch, a rotation sensor, or a lock current detection portion, and
    the forced stop conditions include time lapse forced stop conditions, which are satisfied if a preset time has elapsed.

5. The vehicle seat device according to claim 3, wherein if the forced stop conditions are satisfied, the control portion stops supplying the current to the drive source and thereafter performs a retry control for supplying the current to the drive source again a preset number of times.

6. The vehicle seat device according to claim 3, further comprising a notifier, wherein if the forced stop conditions are satisfied, the control portion allows the notifier to notify of a fact that the forced stop conditions are satisfied.

7. The vehicle seat device according to claim 1, wherein
    the output portion includes a restriction/cancellation position in which the restriction by the lock mechanism and the cancellation thereof are switched,
    the cancellation detection portion is configured by a first switch element, which is switched at a first switch position separated in the forward direction from the restriction/cancellation position,
    the restriction detection portion is configured by a second switch element, which is switched at a second switch position separated in the reverse direction from the restriction/cancellation position,
    in a period in which the operation to cancel the restriction is being made by the operation switch, the first switch element is configured to supply the current to the drive source to rotate the output portion in the forward direction until the first switch element is switched, and stop supplying the current to the drive source when the first switch element is switched, and
    in a case where the operation to cancel the restriction is stopped by the operation switch, the second switch element is configured to supply the current to the drive source to rotate the output portion in the reverse direction until the second switch element is switched, and stop supplying the current to the drive source when the second switch element is switched.

8. The vehicle seat device according to claim 7, further comprising a cancellation member connected to the device to be capable of cancelling the restriction by the lock mechanism, wherein the output portion is configured to engage with the cancellation member via the second switch element at the second switch position, and to be brought into a disengaged state at a position separated in the reverse direction from the second switch position.

9. The vehicle seat device according to claim 7, further comprising a notifier, which notifies of a state where the restriction by the lock mechanism is cancelled.

10. The vehicle seat device according to claim 9, wherein the notifier is switched between a notifying mode and a non-notifying mode by the second switch element such that the notifier is in the notifying mode when the output portion is located at a position separated in the forward direction from the second switch position.

11. The vehicle seat device according to claim 9, wherein the notifier is configured to visually and/or audibly make a notification.

* * * * *